US012748914B2

(12) United States Patent
Nahum et al.

(10) Patent No.: US 12,748,914 B2
(45) Date of Patent: Sep. 29, 2026

(54) USER INTERFACE GENERATIVE ARTIFICIAL INTELLIGENCE FOR DIGITAL TASK SUBMISSION

(71) Applicant: WalkMe Ltd., Tel Aviv (IL)

(72) Inventors: Nir Nahum, Tel Aviv (IL); Yonatan Deshel, Netanya (IL); Moran Shemer, Ra'anana (IL); Ron Zohar, Givatay'im (IL)

(73) Assignee: WalkMe Ltd., Tel Aviv (IL)

(*) Notice: Subject to any disclaimer, the term of this patent is extended or adjusted under 35 U.S.C. 154(b) by 374 days.

(21) Appl. No.: 18/611,358

(22) Filed: Mar. 20, 2024

(65) Prior Publication Data

US 2024/0403545 A1 Dec. 5, 2024

Related U.S. Application Data

(60) Provisional application No. 63/471,129, filed on Jun. 5, 2023.

(51) Int. Cl.
*G06F 40/174* (2020.01)
*G06F 3/0481* (2022.01)

(52) U.S. Cl.
CPC .......... *G06F 40/174* (2020.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 6,246,981 | B1 | 6/2001 | Papineni et al. | |
| 2005/0198563 | A1* | 9/2005 | Kristjansson | G06F 40/174 715/224 |
| 2021/0181909 | A1 | 6/2021 | Leme et al. | |
| 2024/0242020 | A1* | 7/2024 | Jain | H04L 41/5074 |
| 2024/0242021 | A1* | 7/2024 | Cobzarenco | G06F 40/174 |

FOREIGN PATENT DOCUMENTS

| | | | |
|---|---|---|---|
| CN | 114841128 | A | 8/2022 |
| WO | 2021/216108 | A1 | 10/2021 |

OTHER PUBLICATIONS

Fuchs, et al., "Automatic Form Filling with Form-BERT," Short Research Paper II, SIGIR, Jul. 11-15, 2021, pp. 1850-1854, Canada.

* cited by examiner

*Primary Examiner* — Tuan S Nguyen
(74) *Attorney, Agent, or Firm* — Myers Wolin, LLC

(57) ABSTRACT

Method, apparatus and product for task submission using generative artificial intelligence. The method comprises obtaining user input indicating an intent to perform a task; selecting, based on the user input, a target form from a pre-existing form dataset; determining, based on the user input and the target form description, initial field values for at least some of the fields of the target form; providing output to the user indicating the target form and the initial field values; receiving user input that indicates at least one field value of a field in the target form, whereby obtaining determined field values that are based on at least a portion of the initial field values and on the user input; and in response to receiving user confirmation from the user, performing an automation that is configured to submit the target form in a third-party digital system with the determined field values.

34 Claims, 9 Drawing Sheets

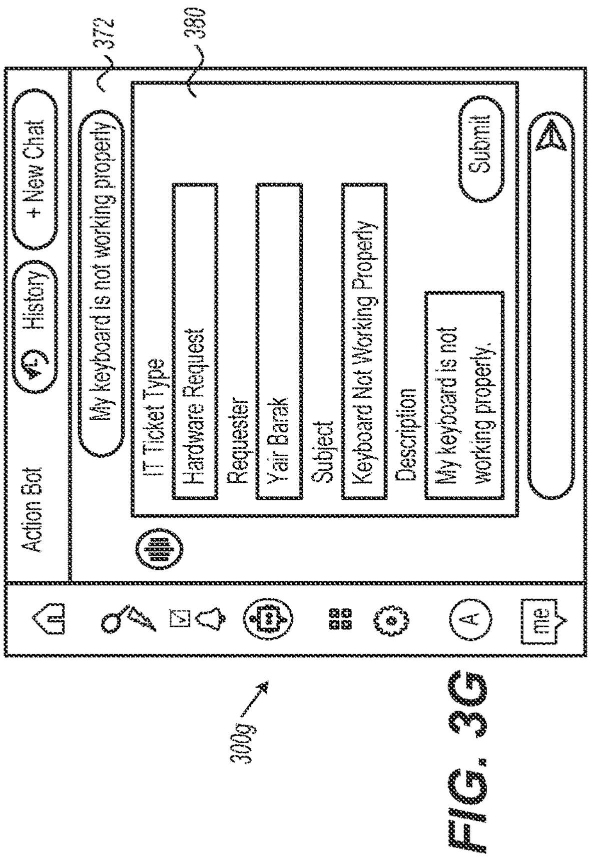
FIG. 3G
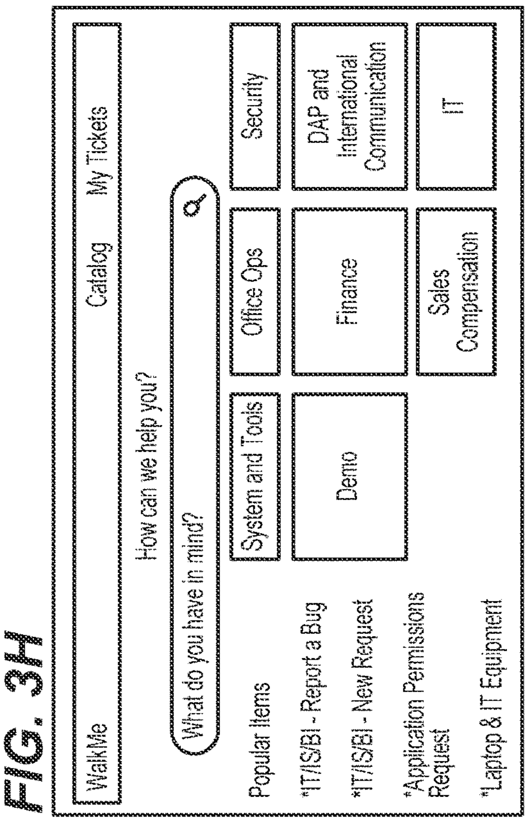
FIG. 3H
FIG. 3I
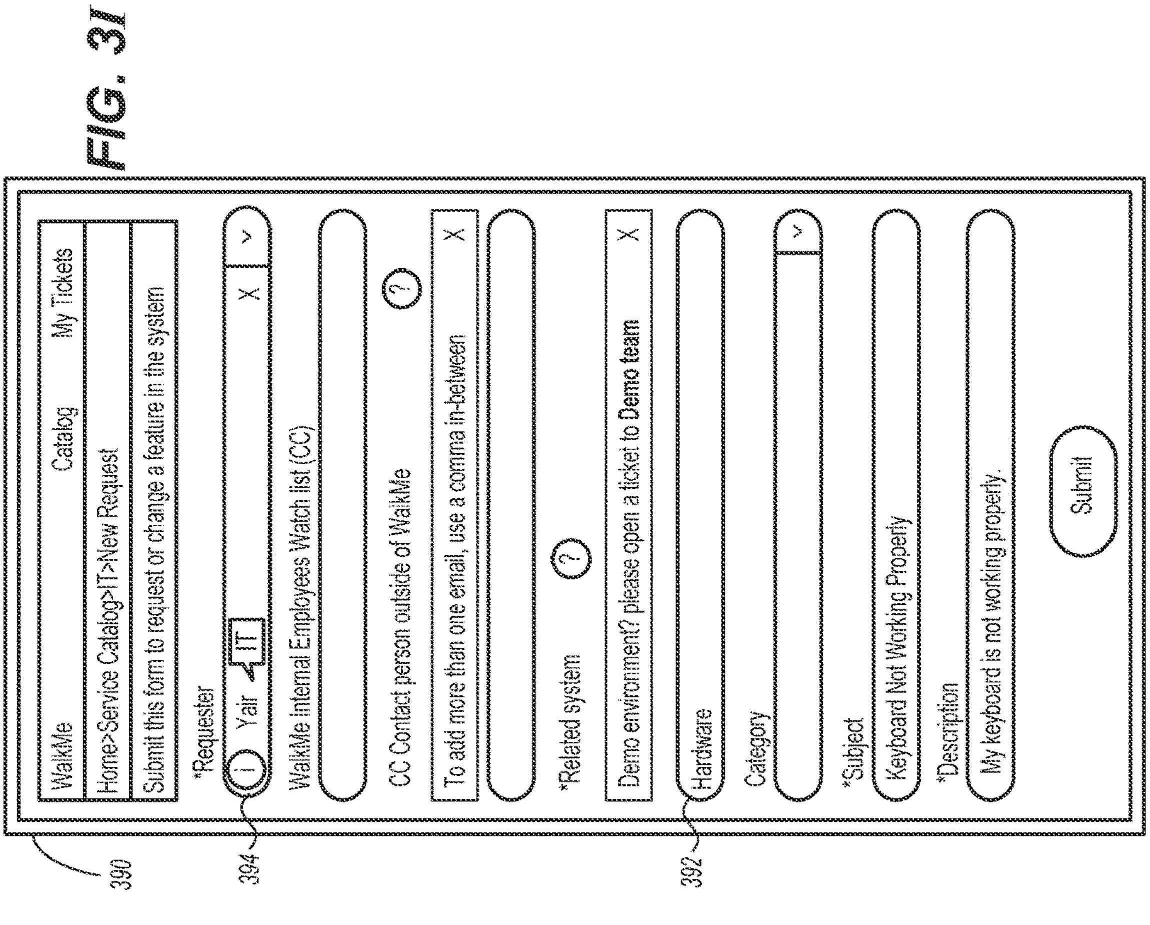

USER INTERFACE GENERATIVE ARTIFICIAL INTELLIGENCE FOR DIGITAL TASK SUBMISSION

CROSS-REFERENCE TO RELATED APPLICATION

This application is a non-provisional of and claims the benefit of U.S. Provisional Application No. 63/471,129 filed Jun. 5, 2023 entitled "USER INTERFACE GENERATIVE ARTIFICIAL INTELLIGENCE", which is hereby incorporated by reference in its entirety without giving rise to disavowment.

TECHNICAL FIELD

The present disclosure relates to artificial intelligence in general, and to generative user interface artificial intelligence, in particular.

BACKGROUND

Digital adoption platforms help users navigate and interact with digital assets. The platform may provide guidance and assistance to users as they navigate through software applications or websites. The platform may analyze user behavior, understand context, and deliver personalized guidance and support to users in real-time. In many cases, digital adoption platforms may be no-code platforms, enabling non-programmers to define, using a simple interface, automations, rules, or the like. In some cases, a click-based interface may enable a user to select a desired widget, define a behavior with respect thereto, and define a sequence of events (with or without branch conditions)

AI algorithms may be used to track user interactions, identify patterns, and provide contextual prompts and walkthroughs to help users complete tasks, learn new features, and overcome obstacles. AI capabilities allow it to adapt a guidance based on user behavior and dynamically provide assistance when needed.

User experiences may be enhanced by increasing user adoption and proficiency, and reducing the learning curve associated with software applications and websites. It provides a more intuitive and personalized user journey, ultimately improving productivity and engagement.

BRIEF SUMMARY

One exemplary embodiment of the disclosed subject matter is a method comprising: obtaining a natural language input from a user that is using a user interface, wherein the natural language input indicates an intent to perform a task, the user is a member of an organization; selecting, based on the natural language input, a target form from a pre-existing form dataset, the target form is a digital form in a third-party digital system, the form dataset comprises form descriptions of forms that are utilized by the organization, wherein a form description relating to a form comprises at least names of fields of the form, the target form is associated with a target form description; determining initial field values for at least a portion of fields of the target form, wherein said determining the initial field values is performed based on the natural language input and the target form description; and providing, via the user interface, output to the user indicating the target form and the initial field values; receiving user input from the user, the user input indicating at least one field value of a field in the target form, whereby obtaining determined field values that are based on at least a portion of the initial field values and on the user input; and in response to receiving user confirmation from the user, performing an automation that is configured to submit the target form in the third-party digital system with the determined field values.

Another exemplary embodiment of the disclosed subject matter is a computerized apparatus having a processor and a memory coupled thereto, the processor being adapted to perform the steps of: obtaining a natural language input from a user that is using a user interface, wherein the natural language input indicates an intent to perform a task, the user is a member of an organization; selecting, based on the natural language input, a target form from a pre-existing form dataset, the target form is a digital form in a third-party digital system, the form dataset comprises form descriptions of forms that are utilized by the organization, wherein a form description relating to a form comprises at least names of fields of the form, the target form is associated with a target form description; determining initial field values for at least a portion of fields of the target form, wherein said determining the initial field values is performed based on the natural language input and the target form description; and providing, via the user interface, output to the user indicating the target form and the initial field values; receiving user input from the user, the user input indicating at least one field value of a field in the target form, whereby obtaining determined field values that are based on at least a portion of the initial field values and on the user input; and in response to receiving user confirmation from the user, performing an automation that is configured to submit the target form in the third-party digital system with the determined field values.

Yet another exemplary embodiment of the disclosed subject matter is a computer program product comprising a non-transitory computer readable storage medium retaining program instructions, which program instructions when read by a processor, cause the processor to perform a method comprising: obtaining a natural language input from a user that is using a user interface, wherein the natural language input indicates an intent to perform a task, the user is a member of an organization; selecting, based on the natural language input, a target form from a pre-existing form dataset, the target form is a digital form in a third-party digital system, the form dataset comprises form descriptions of forms that are utilized by the organization, wherein a form description relating to a form comprises at least names of fields of the form, the target form is associated with a target form description; determining initial field values for at least a portion of fields of the target form, wherein said determining the initial field values is performed based on the natural language input and the target form description; and providing, via the user interface, output to the user indicating the target form and the initial field values; receiving user input from the user, the user input indicating at least one field value of a field in the target form, whereby obtaining determined field values that are based on at least a portion of the initial field values and on the user input; and in response to receiving user confirmation from the user, performing an automation that is configured to submit the target form in the third-party digital system with the determined field values.

In some exemplary embodiments, said providing comprises displaying a mini-form in the user interface, the mini-form is a Graphical User Interface (GUI) widget having input fields that match the at least portion of the fields of the target form, the input fields of the mini-form are labeled with a corresponding field name based on field names of the target form, wherein initial values of the at least portion of the fields are set based on the initial field values.

In some exemplary embodiments, said receiving user input comprises: receiving a user update instruction to a field in the mini-form thereby changing an initial value to an updated value.

In some exemplary embodiments, said receiving user input comprises: receiving a user instruction to set a value to a field in the mini-form that does not have a previous set value.

In some exemplary embodiments, the mini-form comprises a confirmation button that is user-interactable, wherein the confirmation button is configured to indicate the user confirmation.

In some exemplary embodiments, in response to performing the automation, causing the confirmation button to become disabled, whereby preventing additional user interaction with the confirmation button.

In some exemplary embodiments, the mini-form comprises a rejection button that is user-interactable, wherein interaction with the rejection button is indicative of a wrong form and causes a re-selection of another form instead of the target form.

In some exemplary embodiments, the method further comprises: selecting, based on the natural language input, a second target form from the pre-existing form dataset; determining initial field values for at least a portion of fields of the second target form; presenting in the mini-form one or more fields of the second target form with the determined initial field values thereof; and in response to a user rejecting the second target form, performing said providing, whereby replacing a form that is represented by the mini-form.

In some exemplary embodiments, the method further comprises: selecting, based on the natural language input, a second target form from the pre-existing form dataset; determining for at least a portion of fields of the second target form; wherein the mini-form is responsive to user instruction and is configured to selectively switch between a first display and a second display, the first display representing the target form and utilizing the initial field values for at least the portion of fields of the target form, the second display representing the second target form and utilizing the initial field values for at least the portion of fields of the second target form.

In some exemplary embodiments, the target form comprises a field, wherein the mini-form does not provide a display representing the field, whereby the mini-form is a compact presentation of the target form with a reduced number of fields compared to a number of fields in the target form. The method of claim 2, wherein the target form description comprises a fill requirement that indicates a mandatory field of the fields of the target, wherein the mini-form comprises a mandatory input field corresponding to the mandatory field, wherein the user confirmation in the mini-form is contingent on the mandatory input field being filled in the mini-form.

In some exemplary embodiments, members of the organization use a plurality of third-party digital systems, including the third-party digital system, wherein the pre-existing form dataset comprises information about forms from the plurality of third-party digital systems.

In some exemplary embodiments, the output that is provided to the user indicates that the target form is a form in the third-party digital system In some exemplary embodiments, the user interface is external to the third-party digital system.

In some exemplary embodiments, the form description comprises a fill requirement of the form, wherein said selecting is further based on the fill requirement.

In some exemplary embodiments, said selecting is biased to prefer selecting a first form over a second form, the first form having a lower number of fill requirements that are not fulfilled than the second form.

In some exemplary embodiments, said determining the initial field values comprises: generating a prompt based on the natural language input and based on the target form description; and feeding a Large Language Model (LLM) with the prompt.

In some exemplary embodiments, the method further comprises: in response to said determining initial field values and prior to said providing output, determining that a form submission of the target form using the initial field values is invalid in view of at least one fill requirement of the target form; in response to a determination that the form submission of the target form using the determined field values is invalid, prompting the user to provide the user input, the user input is a second natural language input that is provided via the user interface; and determining, based on the second natural language input and based on the target form description, a portion of the determined field values, thereby preventing the automation from submitting the target form with the values that do not comply with the at least one fill requirement.

In some exemplary embodiments, said performing the automation comprises mimicking user interaction with a Graphical User Interface (GUI) of the third-party digital system by clicking on elements and inputting text into fields, whereby reaching a GUI display of the target form in the third-party digital system and filling the portion of the fields with the determined field values.

In some exemplary embodiments, the method further comprises prompting the user to manually approve submission of the target form, whereby a second user confirmation is provided.

In some exemplary embodiments, the automation is performed using an Application Programming Interface (API) call of the third-party digital system, wherein the API call is configured to provide a functionality of submitting the target form.

In some exemplary embodiments, the automation is a pre-baked automation process that is configured to automatically fill-in values in the target form of the third-party digital system, the pre-baked automation process is automatically generated and published in a digital adoption platform used by the organization.

In some exemplary embodiments, said selecting is performed based on user context data, the user context data comprises at least one of: a role of the user in the organization, a department of the user within the organization, permissions of the user that define which of the forms that are utilized by the organization the user is allowed to use, a client device used by the user for providing the natural language input, a user location of the user when providing the natural language input, user form selection history, user form usage history, and a time in which the user provides the natural language input.

In some exemplary embodiments, said selecting is performed by a learning model, the learning model is trained based on a training dataset, the training data comprises historic form submissions that were submitted by members of the organization, a historic form submission of the historic form submissions comprises: an indication of a form being submitted; and values of at least a portion of fields of the form being submitted.

In some exemplary embodiments, the natural language input is at least one of: a voice-based input and a free-text input.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 3A-3I show illustrations of an exemplary user interface interactions and for conversational interfaces, in accordance with some exemplary embodiments of the disclosed subject matter;

DETAILED DESCRIPTION

Figure 1A:
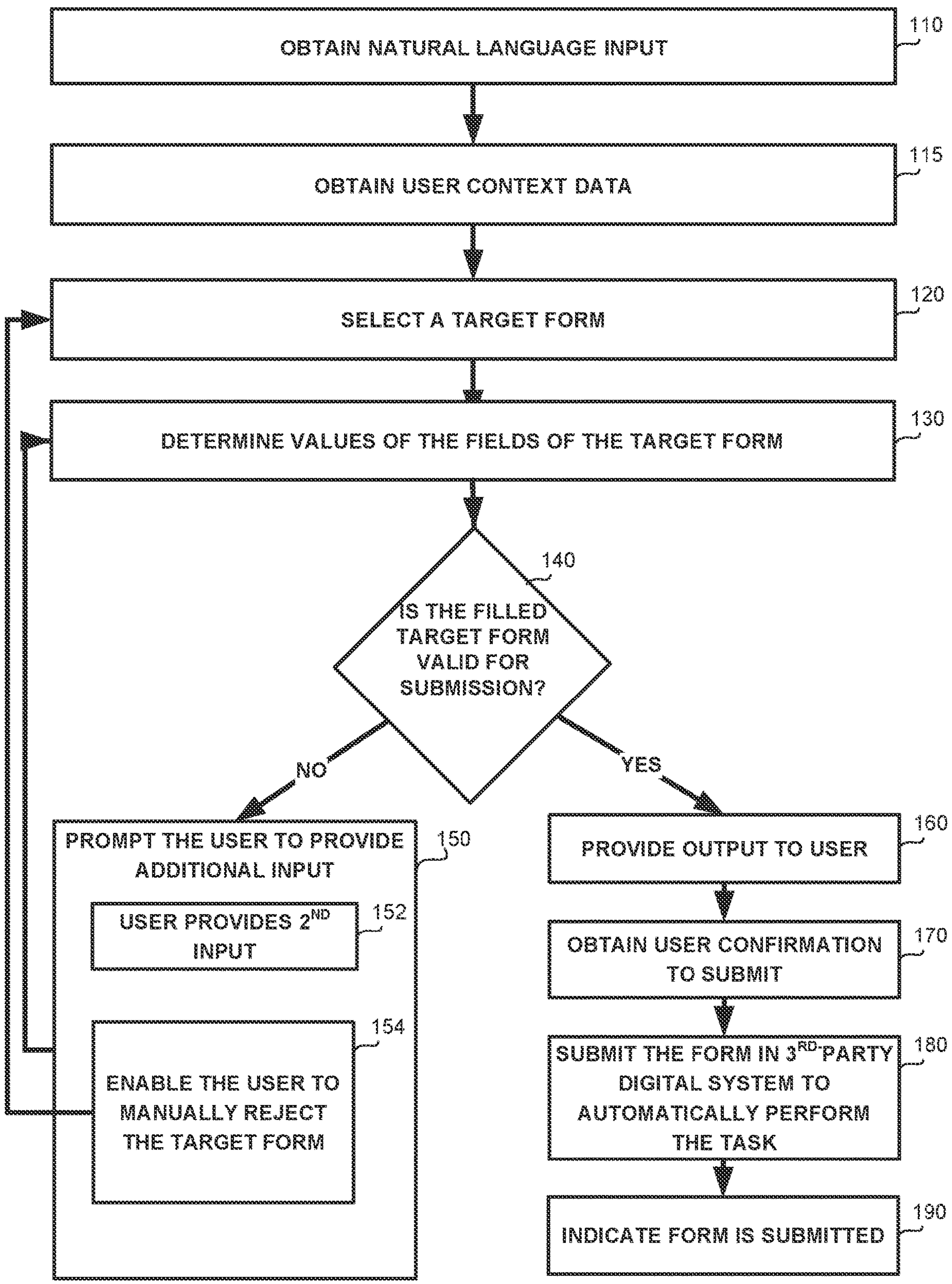
FIGS. 1A-1C show flowchart diagrams of methods, in accordance with some exemplary embodiments of the disclosed subject matter.

One technical problem dealt with by the disclosed subject matter is to facilitate human users in performing digital tasks. The digital tasks may comprise actions or activities that users perform using digital devices or platforms. The digital tasks may vary in complexity and purpose, encompassing a broad spectrum of actions conducted in the digital realm. In some cases, performing the tasks may comprise several actions, such as navigating a website, clicking on links, accessing different pages, using search functionalities, or the like. Performing the tasks may require dynamic actions, in which the user is required to provide and submit data, create and edit content, or the like, such as filling fields, providing personal information, creating and editing documents, presentations, images, videos, or other digital content using software applications, communicating with other instances or systems, conducting research, extracting data, or the like.

In some exemplary embodiments, performing digital tasks may involve form submission, such as digital forms, web-based forms, or the like; into designated systems, websites, applications, or the like. The forms may be electronic interfaces designed to collect and organize specific pieces of information from users, such as interactive Graphical User Interfaces (GUIs) presented within software applications or websites, containing designated fields and elements to capture, process, and store user-provided data in a structured manner. The forms may be designed to enable users to input data, make selections, and perform various actions directly on a screen.

Another technical problem may be to enhance and facilitate these digital tasks and form filing by utilizing AI algorithms to provide guidance, context-aware prompts, personalized assistance, and improve the overall user experience. It may be desired to provide users with a robust, yet simple, natural-language-based interface in which the user interacts with the interface and the interface identifies the relevant form in the digital systems utilized by the organization of the user that is relevant to the user's intent, and to enable automated filling of the relevant form.

It is noted that preserving security and privacy is important when automating such digital tasks. Hence, another technical problem is to maintain privacy and security, when implementing a solution that automates third-party digital system employed by the organization.

For simplicity of disclosure, the description focuses on end users who are employees. However, the disclosed subject matter is not limited to such scenarios.

One technical solution is to employ Machine learning-based User Interface analysis (MLUIA) technology to facilitate employees in performing their digital tasks. In some exemplary embodiments, conversational interface systems may be designed to understand and interact with the underlying User Interface (UI) at a granular level, using MLUIA technology. It can identify and interpret various UI elements, such as buttons, text fields, dropdown menus, or the like, regardless of changes in the UI design or structure. This allows the system to provide accurate and relevant guidance and automation even when the UI of the digital platform changes. MLUIA technology is disclosed, for example, in U.S. Pat. No. 10,620,975, entitled "GUI ELEMENT ACQUISITION USING A PLURALITY OF ALTERNATIVE REPRESENTATIONS OF THE GUI ELEMENT", dated Apr. 14, 2020, U.S. Pat. No. 10,713,068, entitled "ACQUISITION PROCESS OF GUI ELEMENTS USING USER INPUT", dated Jul. 14, 2020, U.S. Pat. No. 9,934,782, entitled "AUTOMATIC PERFORMANCE OF USER INTERACTION OPERATIONS ON A COMPUTING DEVICE", dated Apr. 3, 2018, all of which are hereby incorporated by reference in their entirety for all purposes without giving rise to disavowment.

In some exemplary embodiments, the system may integrate Machine Learning (ML), Artificial Intelligence (AI), Natural Language Processing (NLP), and MLUIA understandings to provide real-time, context-aware guidance and automation to users navigating digital platforms. Additionally, or alternatively, in addition to providing guidance, the system may be capable of automating tasks through either or both Graphical User Interface (GUI) and Application Programming Interface (API) interactions. The system may be enabled to perform tasks on behalf of the user, either by interacting with the UI elements or by making API calls to the underlying system. The automation may be both in the level of navigating to the form, such as reaching the form through a URL, or through mimicking user interactions with widgets and button to navigate to the form, and in the level of filling the form and submission thereof, such as by mimicking user interaction with widgets, input fields, buttons, or the like, to access fields of the form, input information thereof, make selection thereby, submit the information, or the like. This automation can significantly increase efficiency and reduce the potential for user error.

In some exemplary embodiments, a machine learning component may be utilized to enable the system to learn from each interaction with users and continuously improve its performance. The learning process may be adapted to individual user needs and preferences, to optimize the guidance and automation it provides over time.

In some embodiments, the system may be configured to utilize NLP to understand user queries in natural language and provide responses that guide the user through the necessary steps to complete their tasks. As an example, NLP can power chatbots and virtual assistants that interact with users in natural language, understanding their queries and providing relevant guidance. The user input may be analyzed to determine the intent, and contextually respond with appropriate suggestions or actions. As another example, the system may utilize NLP to analyze user behavior, preferences, and contextual cues to provide personalized recommendations, such as based on the role of the user, the type of forms or action the user usually performs, the platforms the user utilizes to perform such actions, or the like. By understanding user intent, their interactions, and historical data, the system can offer tailored suggestions for forms, actions, content, or services. This allows for a more engaging user experience and increased conversion rates.

Additionally, or alternatively, NLP models may be utilized to identify user intents and route them to the appropriate form from the appropriate platform, department or resources, to collect an accurate input for performing the desired action or task. This enables automated triaging and handling of user requests, saving time and improving efficiency. Additionally, or alternatively, the system may be configured to utilize NLP techniques to summarize large volumes of text, such as from different forms, different platforms, or the like, to identify fields or values required for performing the action or the task. By condensing the content into key points or extracting relevant information, the system can provide users with concise and contextually relevant fields to be filled, while neglecting irrelevant information and avoiding collecting unnecessary data. This helps automating navigation to the form and providing the information quickly and efficiently.

Another technical solution is to automate the identification and submission of forms in digital systems based on user input and based on the context data of the user related to performing the task or submitting the form. The automated identification and submission of forms may be achieved using ML and AI techniques that allow users to complete digital tasks efficiently and accurately by using natural language input.

In some exemplary embodiments, the user may be enabled to provide input via a natural language interface that indicates the user's intent to perform a specific task. A target form to be used for implementing the specific task may be automatically selected based on analysis of the natural language input that is provided by the user. The solution is described with respect to textual natural language input. However, other types of input may be provided by the user, such as using voice-based input, that may be processed to derive the intent of the user to perform the specific task, and the relevant information. Additionally, or alternatively, a textual input may be generated based on other types of input provided by the user, or interactions of the user with the system. In some exemplary embodiments, the target form may be selected from a pre-existing form dataset. The form dataset may comprise descriptions of digital forms from third-party digital systems. A form description may comprise description of the task performed by the form, names of fields of the form, fill requirements, or the like.

In some exemplary embodiments, a computational model that is created based on data associated with forms from previous submissions, may be utilized to select the relevant form from the form dataset based on the user input. In some cases, the selection may be further based on user context data of the user. The data may comprise form description, user context data of users associated with filling and submission of the form, or the like.

The solution is described with respect to AI models being utilized as the computational models for different tasks in different stages of the solution. However, other types of computational models, such as mathematical models, algorithmic models, machine learning models, or the like, may be utilized for selecting, filling, and submission of the form. As a non-limiting example, textual similarity may be computed between a text describing a form and between the user's natural language input, as a measurement indicating likelihood that the user's intent is to use this specific form. In some exemplary embodiments, the user may be a member of an organization. The organization may utilize an ensemble of designated third-party systems. Members of the organization may submit forms using any or all of the ensemble of designated systems. The utilized computational model may be an organization-specific computational model that is trained to select the relevant form from a dataset of pre-existing forms associated with the organization, utilized for fulfilling the task intended to be performed by the user, in accordance with the organization's requirements and resources. The selection may be performed based on the user input, and based on organization's specific form descriptions. As an example, the computational model may be an algorithmic model configured to select a target form based on textual similarity between the text determined based on the user input and text associated with the description of the target form, such as a topic summary, a title, or the like. As another example, the target model may be selected based on keyword search.

Additionally, or alternatively, the selection may be performed based on user context data of the user. The user context data may comprise user-specific information, such as the role of the user in the organization, the department of the user within the organization, access permissions of the user in systems associated with the organization (such as permissions of the user defining which of the systems that are utilized by the organization the user can access, permissions defining which of the forms in a system the user is allowed to use, or the like), the device used by the user when submitting the input, location and time of providing the input, user form selection and submission history (e.g., past selections of forms to be used as target forms, such as giving preference to forms that the user had previously selected as target forms), user form usage history (e.g., usage of the user of forms in the relevant third-party systems, such as giving preference to forms that the user uses in the third-party systems), or the like. The user context data of the user may be utilized to understand user preferences, habits and estimated usage pattern. It is noted, for example, that based on their role, a same text may be resolved to an intent to fill a different form. For example, "add a new contact person" could be resolved for a secretary as relating to entering a new contact person in a CRM, while for an HR specialist, the same text might be resolved as adding a contact person for an employee in an HR digital platform.

It may be noted that the dataset of pre-existing forms may comprise forms from multiple systems, such as forms from different third-party platforms, forms from different types, or the like. The dataset may comprise data related to the pre-existing forms, such as fields' names, fill requirements of the fields or of the form, restrictions, values types and ranges of the fields, or the like. In some exemplary embodiments, the dataset may further include information regarding how the form is to be served, such as a URL, URI, or the like, to the digital representation of the form in the respective third-party system. The dataset may be available and utilized for selection and submission of the relevant form.

In some exemplary embodiments, initial field values for at least a portion of fields of the target form may be determined based on the natural language input and the target form description. The initial field values may be determined using natural language understanding tools, text generation tools, conversational interaction tools, or the like. Additionally, or alternatively, the initial field values may be determined using AI models, such as general, organization-agnostic AI models, or the like.

In some exemplary embodiments, an output presenting the filled version of the selected form may be provided to the user, to inform and enable the user to manually review and approve the automated form submission. In some exemplary embodiments, the output may be displayed as a mini-form in the user interface. A mini-form, or other alternative GUI that is not part of the target digital system, may be displayed in the natural language interface, allowing users to review and update the field values before authorizing the automation. The mini-form may be a compact representation of the form with respect to relevant information that the user provided or that the user should provide. The mini-form may be a representation of the form (of the digital system) in a different system (e.g., the DAP platform). The input fields of the mini-form may be labeled with corresponding field names based on field names of the target form. Initial values of the at least portion of the fields may be set based on the initial field values or portion thereof.

In some exemplary embodiments, multiple candidate forms may be selected according to the user input. The different candidate forms may be forms from different platforms, forms associated with different tasks or different aspects of the intended task, or the like. Additionally, or alternatively, the different candidate forms may comprise different sets of fields, different fill requirements, or the like. Additionally, or alternatively, the different candidate forms may be forms associated with a certain task in accordance with different user context data of the user, such as different forms may be utilized for the same task for users from different departments. Additionally, or alternatively, the different candidate forms may comprise similar forms that are filled with different initial values. In some exemplary embodiments, when multiple forms are suitable for performing the intended task, the system may be biased into selecting the best target form in fulfilling the filing requirement for the user input.

Additionally, or alternatively, the multiple candidate forms may be represented to the user, such as via the user interface, such as multiple mini-forms. The multiple mini-forms may be responsive to user instruction and interaction. The user may be enabled to selectively switch between different displays of different target forms. The user may be enabled to select the matching target form from the multiple mini-forms.

In some exemplary embodiments, validity checks may be performed on the determined field values to ensure a valid form submission. If invalid, the user may be prompted to provide additional input or correct the invalid information. The submission of the filled form may be performed via automation execution functionality of the DAP platform, upon confirmation of the user. The automation process may be configured to mimic user interaction with the digital system's GUI to fill in the fields, such as that no API implementations is required with any underlying third-party digital system. In some cases, the automation may end by prompting the user to provide final confirmation before the form is submitted.

In addition to the form dataset, a dataset of automations may be retained with respect to at least a portion of the forms. The automation dataset may be a part of a Digital Adoption Platform (DAP) platform, and include automations that may be implemented by the DAP platform. In some cases, automations may be user-defined in a no-code environment. Additionally, or alternatively, some automations may be automatically generated and maintained (pre-baked automations). In some cases, in order for an automation to be implemented by the clients of the DAP platform, the automation may be defined and published, enabling clients to gain access thereto. In some cases, published automations may have access permissions defined with respect thereto, defining to which users the automation is made available. The DAP platform or software may be layered on top of other software products, apps, or websites and helps to accelerate proficiency by directing users through key tasks and providing interpretive and evaluative information as users navigate their way through a product.

One technical effect of utilizing the disclosed subject matter is enhancing digital adoption and productivity in organizations. By offering real-time, personalized assistance and automation, the disclosed subject matter reduces the learning curve associated with new software and digital platforms, and helps users perform their tasks more efficiently and effectively.

Another technical effect of utilizing the disclosed subject matter is enabling an enterprise automation of text to action, such as an automation action on Software as a Service (SaaS) applications, or specific systems application. The disclosed subject matter enables identification of the relevant forms and generating an automatic submission thereof based on the user text.

Yet another technical effect of utilizing the disclosed subject matter is paving the way to responsible AI that can be suitable for each enterprise. The disclosed subject matter enables an experience that is predictable, explainable and safe, unlike other forms of generative AI. The predictability may be achieved by using the filled mini-form. Accordingly, even when there are mistakes in filling the form or analyzing the data, the mistakes may be easily viewed and corrected before any automation is implemented, such as when displaying the mini-form to the user, when asking for additional required data, or the like. As the displayed form is compact and potentially minimal, it may be easy to the user to identify if there are mistakes in the parsing and to easily fix or request to fix such mistakes. This is different from open-ended approaches that only try to automate clicks as humans and can lead to errors. Predictability and safety are also obtained by providing automations that are configured to fill the respective form but wait for final user approval prior to form submission.

Yet another technical effect of utilizing the disclosed subject matter is providing a GUI-rich experience using LLMs, and overcoming limitations of chatbots and automation tools, by enabling the users to efficiently and easily provide the required context.

Yet another technical effect of utilizing the disclosed subject matter is providing an improvement in DAP platforms enabling to automate submissions of forms without relying on the manual definition of form submission automation. Instead, pre-baked automations may be generated automatically with respect to forms that are described in the dataset of pre-existing forms.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, a user input may be obtained from a user. The user input may be obtained using an interface designed to enable communication between users (such as members of a certain organization, general users attempting to use AI tools, or the like) and a computer system that utilizes natural language, to facilitate interaction. The interface may be a natural language interface that enables the user to provide textual input, prompts, or the like. As an example, that input may be provided by the user using a chat widget embedded in the website, either explicitly or through the augmentation of a browser extension, a native chat widget in the desktop, a third-party chat platform (such as Whatsapp™, Slack™, or the like), or the like.

In some exemplary embodiments, the textual input may be obtained in a natural language, e.g., English, spoken language, non-formal language, or the like. As an example, the textual input may be a specific prompt, or a free-text, such as: “Make my sister my emergency contact”, “Create a new opportunity for Coca-Cola for 50K”, “Take a vacation for me next week”, or the like. The textual input may be indicative of an intent of the user to perform a task (e.g., “adding an emergency contact” “creating a new opportunity”, scheduling a vacation”, or the like). The textual input may comprise information about the task, request to perform the task or actions related thereto, keywords indicative of tasks to be performed, or the like.

Additionally, or alternatively, other types of input may be obtained using other types of conversational interfaces, such as visual input, vocal input, or the like. Such input may be converted to a textual format to enable processing thereof. As an example, the conversation interface may be a smart assistance, such as Siri™, Google™ assistant, or the like, in which user input is provided using voice.

On Step 115, user context data of the user may be obtained. The user context data may comprise various types of information that capture how the user interacts with or utilizes the natural language interface, how the user perform tasks in the organization, user access permission data, user characteristics, or the like.

In some exemplary embodiments, the user context data may comprise a department in the organization that the user belongs to, an organizational role of the user in the organization, information about the user’s role, position, or responsibilities within the organization, or the like. Such data may be utilized to identify the true intent of the user and identify the correct task the user intends to be performed, tailor responses or actions based on the user’s organizational function or authority level, or the like. As an example, the user context data may comprise the department of the user (e.g., “Sales”, “Finance”, “Legal”, or the like), the role of the user in the organization or specifically in the department, (e.g., “Manager”, “Accountant”, or the like), geography of department (country, specific location, or the like), or the like.

Additionally, or alternatively, the user context data may comprise information about the client device used by the user for providing the textual input, such as a type of device (e.g., computer, tablet, smartphone, or the like), Internet Protocol (IP) address of the device, current geolocation of the device (which may be different from the user’s known location), specifications of the operating system, browser, tool or application used by the user to access and interact with the natural language interface, or the like. Understanding the device can help in optimizing the user interface or response for that specific device.

Additionally, or alternatively, the user context data may comprise information about the user location when providing the textual input, such as geographical information, user’s general location (city, country, time zone), physical location of the user within the organization assets when providing the textual input (inside or outside an enterprise of the organization, department, floor, room number, or the like), or the like. Location data may be analyzed to provide context-specific insights regarding the task to be performed. Location data may be determined using GPS sensors, triangulation, IP address geolocation lookup, or the like.

Additionally, or alternatively, the user context data may comprise information about the time of providing the textual input, such as an accurate time, whether the textual input is provided during organizational work time or during out of office hours, or the like. The time data may be utilized for understanding patterns of usage, peak times of activity, identifying time-sensitive tasks, or the like.

Additionally, or alternatively, the user context data may comprise information about permissions of the user that define which of the forms that are utilized by the organization the user is allowed to use. The user context data may comprise details about the user’s access rights or restrictions within the organizational system, and what actions the user is allowed or disallowed to perform. As an example, a manager may have access to budget-related forms, while an employee in a different department may not. As another example, a data entry specialist may have permission to update or modify inventory records, while others can only view the data (read-only access). As yet another example, some organizational units may have dedicated systems, and only members of a certain organizational unit may be allowed to use a dedicated system and have access to its forms.

In some exemplary embodiments, the textual input may be synthesized from the user input together with the user context data, potentially with additional one or more text strings, such as pre-defined text for guiding the LLM to provide output in a specific format, roleplaying instructions (providing contextualization, expertise emulation, enhanced engagement, target information, or the like). In some cases, the textual input may be generated by concatenating the user input and a textual string representing the user context data. The textual input may be generated by further concatenating one or more additional pre-defined text strings, such as providing the LLM specific instructions. LLM prompt generation is explained in detail in U.S. Provisional Application No. 63/530,184 filed Aug. 1, 2023 entitled “LARGE LANGUAGE MODEL-BASED RULES IN DIGITAL ADOPTION PLATFORMS”, which is hereby incorporated by reference in its entirety for all purposes without giving rise to disavowment.

On Step 120, a target form may be selected from a pre-existing form dataset. In some exemplary embodiments, the selection of the target form may be performed using a computational model, such as an ML model, an AI model, a generative AI model, a Large Language Model (LLM), a Generative Pre-trained Transformer (GPT), or the like. In some exemplary embodiments, the computational model may be designed to identify the task based on the user input and the user context data of the user. The computational model may be configured to analyze the user input, while interpreting the context in which the user is communicating, along with the user context data of the user, considering previous interactions, ongoing conversations, user history, or the like. Incorporating the user context data into the computational model's decision-making process enables for personalized and context-aware interactions, enhancing the overall user experience and the effectiveness in understanding and fulfilling the user's intents.

In some exemplary embodiments, the computational model utilized for target form selection may be an organization-specific model, trained to select the target form from one or more respective datasets associated with the organization, such as digital forms used by members of the organization to perform tasks, or the like. The organization-specific model may be trained based on data associated with the organization, such as submission data of members of the organization, context and behavioral data of different members of the organization, or the like. In some exemplary embodiments, the computational model may be trained based on training data associated with the organization, prior to obtaining the user input. The training data may comprise comprises historic form submissions that were submitted by members of the organization, such as which form were submitted to perform a certain task, which forms were submitted by members having specific features or behavioral patterns, values of fields of the forms being submitted by each member, group of members, type of forms, behavioral data of the members submitted the form being submitted, or the like. Additionally, or alternatively, the training data may comprise data from third-party digital systems utilized by the members of the organization to submit forms, such as forms from each system, context of the form, or the like.

As an example, the training data may comprise usage analysis of each form utilized by members of the organization (e.g., customers, employees, or the like), or any other metadata of the form and the user filling the form, such as what form fields were actually filled by the user, the order in which the user filled the form, the time required for filling each field and the total time of filling the form, analysis errors identified when filling the fields, or the like. As another example, the training data may comprise context of filing the form by the user, such as time of day, day of week, location, previous screens/process used that led to this form, or the like. As yet another example, the training data may comprise user characteristics of the user filling/submitting the form, such as department, role, or the like.

As another example, the user may ask the system to "Create a new contact for John Smith". If the user is from the sales department, the system may use the create contact form of SALESFORCE® (e.g., the CRM system used by the organization). If the user is from the recruitment team, the system may use the new contact in the hiring form in WORKDAY® (e.g., the HR system used by the organization). If the user is from Europe, the system may use a different hiring software than in the US. If the user is detected to be abroad for his usual location, the system may lean more to travel related systems.

It may be appreciated that in order to preserve privacy of the users, the training data may comprise non-private information only, representative data from each form that enables retrieving the form given a query without exploiting private information, or the like. As an example, an identifier for each form may be formed as any function related to its titles, headers and field. Embedding of some of this information can be useful for future retrieval.

In some exemplary embodiments, the computational model may be configured to select the form, based on the identified task and context, from a form dataset. The form data set may be a pre-existing form dataset, such as a local dataset, an organization-specific dataset, a third-party digital system dataset, a dataset of several third-party systems associated with the organization, a dataset of forms from different third-party systems utilized by the members of the organization, or the like. The form dataset may comprise form descriptions of forms that are utilized by the organization. The form description may comprise properties of the form, such as names of fields of the form, types of values to be filled, fill requirements, categorical fields, mandatory fields, or the like. As an example, some fields may have type restriction, such as having enumerated values, other fields may have restriction on the range of values that can be filled thereto (such as age). As another example, some field may be mandatory because of containing mandatory information for performing the task, values required for submitting the form, values required for determining other mandatory values for performing the task, or the like. Additionally, or alternatively, the form dataset may comprise information about forms from the plurality of third-party digital systems, such as information provided by each of the third-party digital system, submission data of forms submitted by members of the organization in each third-party digital system, or the like.

On Step 130, values of the fields of the target form may be determined. In some exemplary embodiments, the values may be initial values determined automatically based on the textual input and the target form description using computational techniques, such as using a designated computational model. The designated computational model may be a generative AI model, a Large Language Model (LLM), a Generative Pre-trained Transformer (GPT), or the like. The designated computational model may be a second model different than the computational model utilized to select the target form. The second model may be an organization-agnostic model, that may not specially designed, tailored or related to the organization.

In some exemplary embodiments, values of the fields of the target form may be determined based on concatenating the user input with textual strings representing the selected form. For example, the textual strings representing the selected form may indicate names of fields in the form, mandatory fields, type of input for each filed, or the like. It is noted that fill requirements of the form or fields may be synthesized into text instructions. Based on such information, the designated computational model may be instructed to provide an output indicative of which fields of the form are to be filled and with which values. In some cases, the values may be extracted from the user input explicitly (e.g., from "Create a new opportunity for Coca-Cola for 50K", it may be extracted that the value of the "name" field in the "opportunity" form is "Coca-Cola"), or implicitly based on additional data. In some exemplary embodiments, the values may be determined based on the user context data, behavioral data or any other metadata of the user. Referring to the above-mentioned example of "Make my sister my emergency contact": information about the sister of the user may be extracted based on data from other platforms, such as social networks, previous queries, personal information of the user within the organization, or the like.

In some cases, the designated computational model may be instructed to attempt to fill the information even if the filled target form would not constitute a valid form submission. Without such instructions, the designated computational model may be biased towards filling mandatory fields even if the information is never provided. For example, the user input of "create plese a new opportunity for 100K" fails to mention the name of the opportunity, without such instruction the designated computational model might be biased into taking the word "plese", which is a typo of "please" and consider that as the value of the mandatory field. The instruction to the designated computational model may be adapted to cause the model to attempt and fill the fields to the best of its ability, while reducing the potential of outputs that include artificial hallucination. It is noted that artificial hallucination is one drawback of relying on AI models and is considered a potential technical challenge that needs to be overcome in order for human users to rely on AI models.

On Step 140, a determination whether the filled target form is valid for submission may be performed. In some exemplary embodiments, the determination whether the filled target form is valid may be checked with respect to fill requirements of the target form. The textual input may not be sufficient for the designated computational model to determine valid values of all mandatory field of the target form. As an example, some of the values may not be provided by the user, may be provided in wrong format, or the like. As another example, values of additional fields or any additional information may be required. In some cases, non-AI based validation rules may be implemented to determine validity of the filled form. Additionally, or alternatively, an AI model or any other computational model (such as the designated computational model) may be utilized to evaluate whether the filled form is in line with fill requirements, for example as is explained in U.S. Provisional Application No. 63/530,184 filed Aug. 1, 2023 entitled "LARGE LANGUAGE MODEL-BASED RULES IN DIGITAL ADOPTION PLATFORMS", which is hereby incorporated by reference in its entirety for all purposes without giving rise to disavowment.

On Step 150, in response to determining that the filled target form is not valid, the user may be prompted to provide additional input. In some exemplary embodiments, the additional input (Step 152) and/or the prompt thereto (Step 150) may be provided in natural language via the natural language interface utilized for obtaining the user input, such as via the same platform, the same chatbot tool, or the like. In some cases, the prompt may indicate current values of fields of the target form, indication of mandatory fields with undetermined values, indication of wrong values, or the like. In some exemplary embodiments, the user input may comprise an update instruction to a field in the target form, a change of an initial value to an updated value, or the like. Additionally, or alternatively, the user input may comprise an additional value of a field in the target form or an instruction to set a value to a field in the target-form that does not have a previous set value.

In some exemplary embodiments, Steps 130, 140, and 150 may be repeated until the target form filled with the determined values, is determined to be valid for submission. In some iterations, new values of fields of the target form may be determined using the designated computational model and based on the additional textual input and the target form description. The new values may replace values determined in previous iterations, may be new values not determined in previous iterations, or the like.

Additionally, or alternatively, on Step 154, the user may be enabled to de-authorize the target form (e.g., reject or indicate that a wrong target form is selected). The user may perform the rejection by interaction with a designated widget in the user interface such as a de-authorization or rejection button, using a textual instruction or the like. In response to rejecting the selected target form or indicating a wrong form being selected, Step 120 may be repeated to re-select another form instead of the target form based on the user input and-or the updated user input. On Step 160, in response to a determination in Step 140 that the filled target form is valid, an output may be provided to the user. The output may indicate the target form and the determined field values to the user, to enable the user to manually approve automatically determined form submission (Step 170). It is noted that the user approval is performed before any automation is implemented in the target digital system.

On Step 180, in response to receiving a user confirmation from the user to submit the form (Step 170) the filled target form with the determined field values may be automatically submitted in the third-party digital system, thereby automatically performing the task.

On Step 190, an indication that the form is submitted and/or the task is performed may be provided to the user. The indication may be provided using the same user interface with which the user had interacted to provide his or her user inputs, such as a chat bot.

Figure 1B:
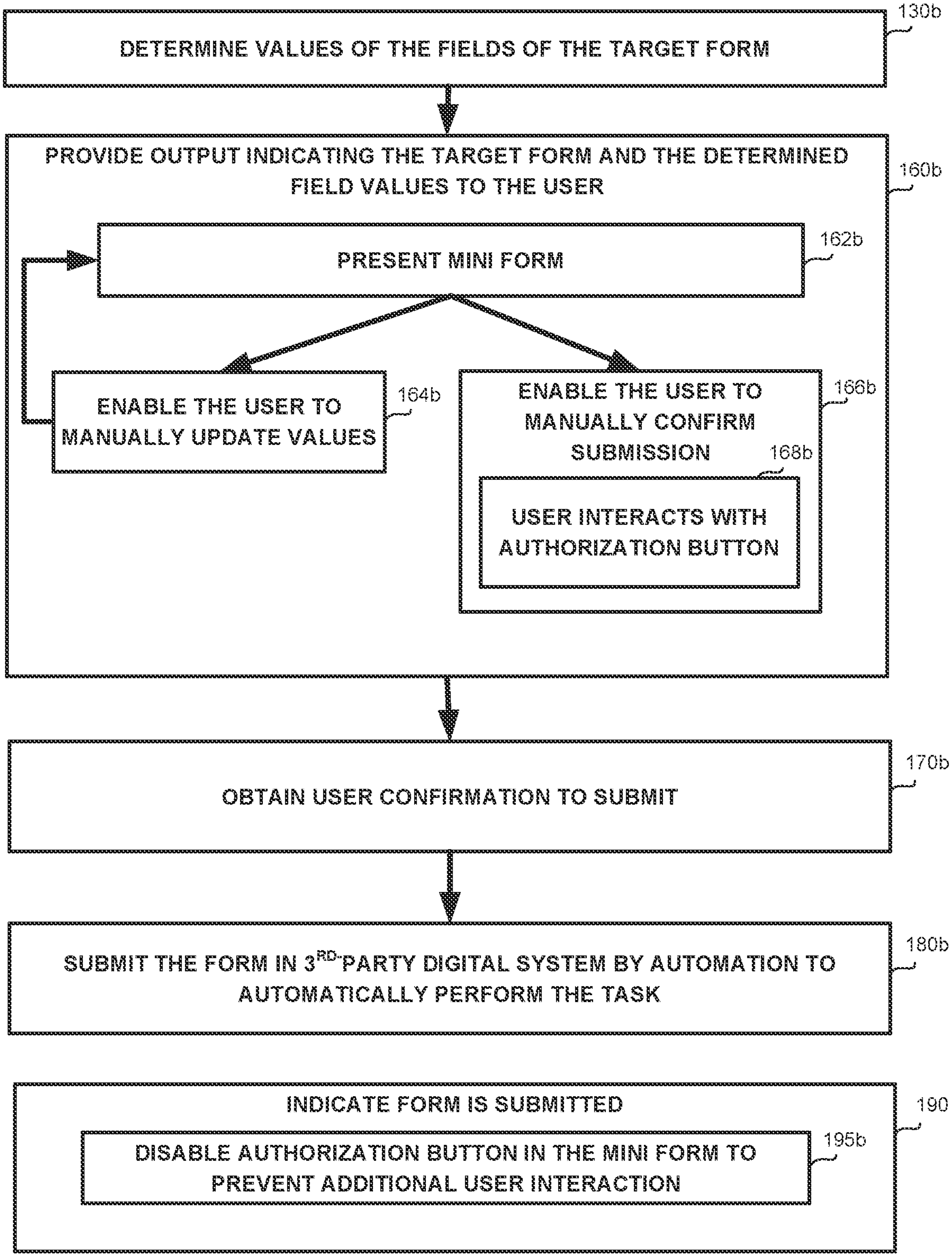

Referring now to FIG. 1B showing a flowchart diagram of a method, in accordance with some exemplary embodiments of the disclosed subject matter. The method of FIG. 1B expands upon portions of the method of FIG. 1A.

On Step 130*b*, values of at least a portion of the fields of the target form may be determined. (similar to Step 130 of FIG. 1A).

On Step 160*b*, an output indicating the target form and the determined field values may be provided to the user. In some exemplary embodiments, the output may be provided by presenting one or more mini forms to the user in the natural language interface (Step 162*b*). The mini-form may be a GUI widget having input fields that match the at least portion of the fields of the target form and the values thereof determined using the designated computational model. Each input field of the mini-form may be labeled with a corresponding field name based on field names of the target form. Each field may be filled with an initial value determined based determined field values in Step 130*b*. The mini-form may be a compact presentation of the target form, having a relatively limited number of displayed fields. In some cases, the compact presentation may have a reduced number of fields compared to a number of fields in the target form. In some cases, the mini-form may include every field of the target form that is determined to be filled. Additionally, or alternatively, the mini-form may include every mandatory field of the target form. Additionally, or alternatively, the mini-form may include fields that are determined to be potentially of importance to the user given the user's intent, also referred to as contextually-important fields. The identification of which fields to be included in the mini-form may be determined by the designated computational model in view of instructions in the textual prompt that is provided thereto. In some exemplary embodiments, the mini-form may exclude at least one field of the target form. For example, fields that are not referenced by the user in the user input (Step 110) and are not mandatory or determined to contextually-important fields, may be omitted. It is noted that contextually-important fields may be identified based on a determination of a probability of filling them is above a threshold given the user's user context data and the user input (which represent the user's intent and desired task).

Additionally, or alternatively, multiple mini-forms may be presented to the user on Step 160*b*. Each mini-form may represent a different target form from the pre-existing form dataset that can be selected as target forms for the identified task, and initial field values for at least a portion of fields thereof. The mini-form display may be responsive to user instruction and is configured to selectively switch between different mini-forms representing different target forms. The user may be enabled to select the target form to be submitted by interacting with the mini-form display.

In some exemplary embodiments, the user may be enabled to review the determined field values, manually update the values in the mini form the natural language interface (Step 164*b*) if necessary. In some cases, the user may input values into fields that were not referenced previously, such as mandatory fields and contextually-important fields. Additionally, or alternatively, the user may be enabled to manually approve the submission (Step 166*b*) such as by interaction with an authorization or confirmation button of the mini-form (Step 168*b*). It is noted that the mini-form is a Graphical User Interface layer that is separate from the underlying target digital system in which the target form is implemented.

On Step 180*b*, in response to receiving a user confirmation from the user to submit the information in the mini-form (Step 170*b*), the filled target form with the determined field values may be automatically submitted in the third-party digital system, thereby automatically performing the task. The automation may be an automation retrieved from an automation dataset of a DAP platform. In some exemplary embodiments, the automation may be implemented without relying on API and by simulating user-interactions with the GUI of the third-party digital system. GUI-based interface that can be used instead of an API-based interface is disclosed in U.S. Pat. No. 10,819,664, entitled "Chat-based application interface for automation", issued Oct. 27, 2020, U.S. Pat. No. 10,620,975, entitled "GUI element acquisition using a plurality of alternative representations of the GUI element", issued Apr. 14, 2020, U.S. Pat. No. 10,777,194, entitled "Automatic performance of user interaction operations on a computing device", issued Sep. 15, 2020, all of which are hereby incorporated by reference in their entirety for all purposes without giving rise to disavowment. In some exemplary embodiments, the GUI-based interface automation may comprise automatically setting values in the target form using the GUI interface. In some exemplary embodiments, in addition to setting the values in the target form, the GUI-based interface automation may also but not necessarily interact with a submission button within the GUI.

On Step 190, an indication that the form is submitted may be provided to the user. In some exemplary embodiments, the automation may be performed on a display that is visually available for the user, who may view the automatic submission of the form. Additionally, or alternatively, the automation may be performed without providing the user a display of the underlying third-party digital system's operation, such as in case of an implementation of the automation on a backend server. In such a case, the indication may be provided by a specific message, or by other means indicating to the user the submission was performed on the third-party digital system.

On Step 195*b*, the authorization button in the mini-form may be disabled. In some exemplary embodiments, the disabling of the authorization button may serve a dual purpose: indicate form submission and prevent additional user interaction therewith. In some cases, the entire mini-form may be disabled, as its purpose may have been fulfilled. In some cases, the mini-form remains displayed, enabling the user to review past interactions (e.g., "chat history"), but without enabling the user to change the values of the mini-form or attempt to re-submit the form.

Figure 1C:
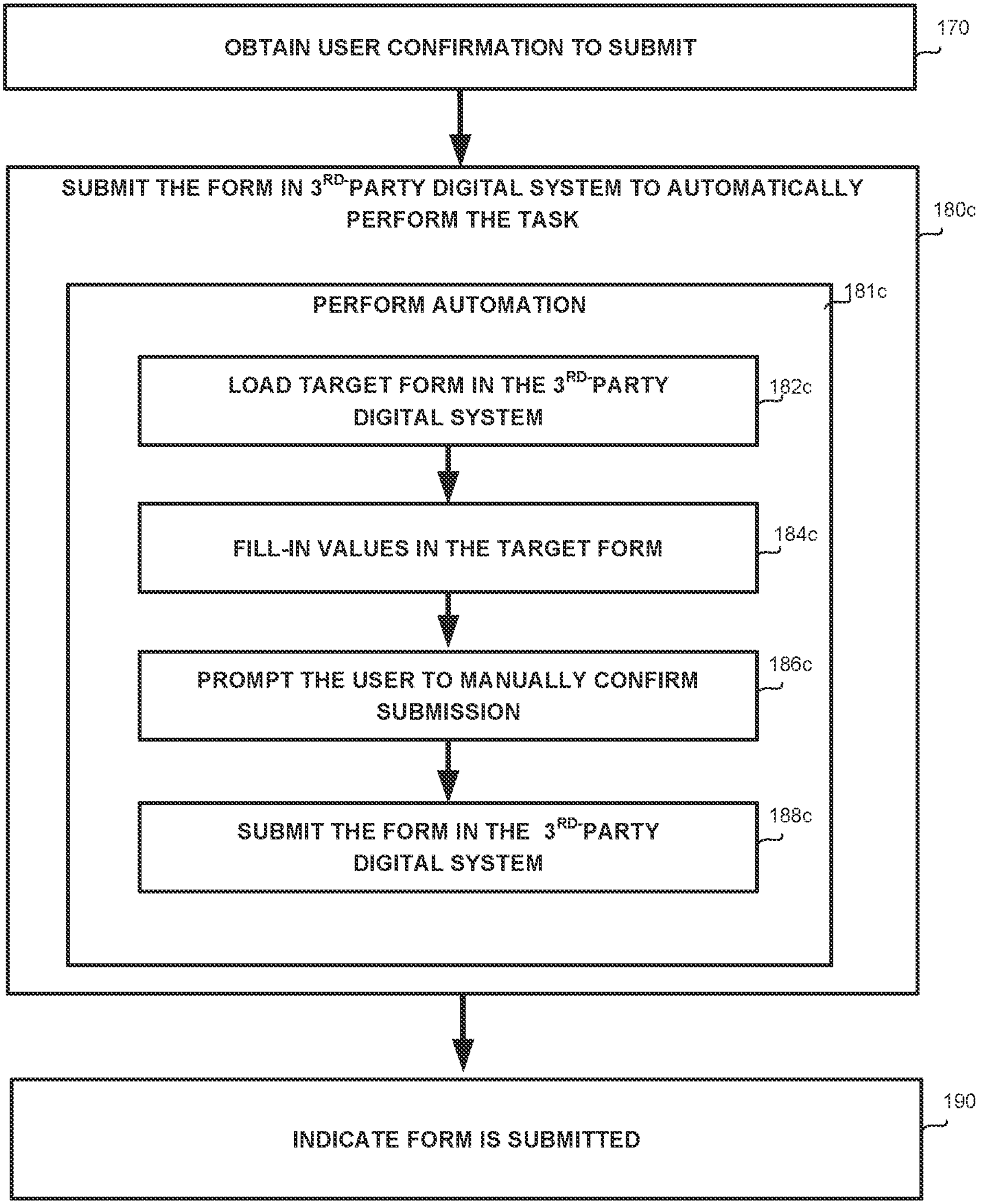

Referring now to FIG. 1C showing a flowchart diagram of a method, in accordance with some exemplary embodiments of the disclosed subject matter. FIG. 1C expands on FIG. 1A and shows one embodiment of Step 180 in detail.

On Step 180*c*, in response to receiving a confirmation from the user to submit the form (Step 170), the relevant automation may be performed. The automation may be performed automatically with or without additional user approval. In some exemplary embodiments, the automation may be configured to fill the target form with the determined field values in the third-party digital system, and to enable submission of the filled form in the third-party digital system, thereby performing the task.

On Step 181*c*, an automation that is configured to submit the target form in the third-party digital system with the determined field values may be performed.

In some exemplary embodiments, metadata describing the automation may be obtained from a dataset of published automations. The metadata may include, for example, a manner enabling to reach the target form. For example, the metadata may include a URI or URL of the form, enabling a browser to reach the target form directly. Additionally, or alternatively, user-simulated navigation may be implanted using the GUI of the third-party digital system to reach the target form. The user-simulated navigation may be implemented by automatically simulating user interaction with the GUI, such as by mimicking button clicks, field selections, widget interactions, or the like, so as to navigate the third-party digital system's GUI until reaching the target form. The automation may involve using tools or frameworks that allow automatically interacting with the web page, filling out forms, clicking buttons, or selecting options.

In some exemplary embodiments, the automation process may be configured to fill in values in the target form in the third-party digital system using a DAP platform. The DAP platform may be configured to create a step-by-step workflow of filling-in the form. In some cases, the DAP platform may create the automation based on captured user interactions, such as clicking buttons, entering data, navigating through the form, or the like. Once the workflow is recorded, the DAP platform may be configured to enable users, such as admins or engineers of the system, also known as "builders", to configure the automation process, by defining rules, conditions, and triggers for when the automation should run, and set access permissions indicating which users can utilize the automation.

In some exemplary embodiments, the automations may be generated manually by engineers or automatically based on existing automations or analysis of previous form submission. In some exemplary embodiments, performing the automation may comprise mimicking user interaction with a GUI of the third-party digital system by clicking on elements and inputting text into fields.

In some exemplary embodiments, the automation process may be set up to automatically fill in values in the target form as per the configured rules and conditions. When certain conditions are met, the DAP platform nay be configured to execute the automation to replicate the recorded steps and populate the form. The DAP platform may further be configured to provide real-time guidance to users, making it easier for them to understand and utilize the automated process. Users may receive on-screen prompts or instructions when interacting with the form. As an example, the automation may fill-in information in the fields of the target form and provide a popup notification or similar visual display to indicate to the user that the automation was completed or that user verification is required.

In some exemplary embodiments, the automation may be a pre-baked automation process that is configured to automatically fill-in values in the target form of the third-party digital system. The pre-baked automation process may be automatically generated and published in a DAP platform used by the organization. The DAP platform may provide the organization a way to manage digital transformation initiatives, and to automate filling and submitting forms. In some exemplary embodiments, the DAP platform may be configured to streamline the automation of repetitive tasks within a third-party digital system by recording, configuring, and executing pre-baked automation processes for each form that the user utilizes. The pre-baked automation may simplify the role of the organization's admin avoiding the need that for each potential form recognized by the disclosed subject matter, a separate automation would be manually defined.

On Step 182*c*, the target form may be loaded in the third-party digital system. The target form may be loaded using a direct URL or URI to the target form. In some cases, user navigation in the GUI of the third-party digital system may be implemented such as by mimicking user interaction with the GUI of the third-party digital system. The information describing how the target form is to be loaded by included in the dataset of pre-existing forms.

On Step 184*c*, the values of the fields of the form in the third-party digital system may be automatically filed by the automation. The filling-in may be performed automatically by mimicking user interaction with the GUI. As an example, the automation may be configured to select each field of the form (e.g., mimicking a point and click action on the field) and for each such field, input the value to be filled. In some cases, the automation may accordingly traverse fields that are not to be filled (e.g., create a focus event on the field, and avoid inputting a new value thereto or set its value to a blank value). The automation may fill in values by inputting values in input fields, selecting values from selectors, or the like. It is noted that permissions to update the form and/or perform database updates in the third-party digital system may be given based on the credentials of the active user, without the automation requiring any specific security-related integration, as it rides upon the user's abilities as the third-party digital system had bestowed in view of his credentials.

On Step 186*c*, the user may be prompted to manually approve submission of the target form. In some exemplary embodiments, the manual approval may be performed directly in the third-party platform. Additionally, or alternatively, the manual approval may be performed through the automation process, such as a step in the automation process that automatically approves submission of the form. It is noted that the approval may be performed after the user had viewed the values inputted in the target form directly, as opposed to the previous potential approval of the data in a mini-form or another interface that is external to the third-party digital system. The approval before the final submission ensures that the information was indeed analyzed correctly, no hallucination had occurred, and the target form is indeed the form the user wishes to submit. In some cases, the automation may simply stop after inputting all the fields' values and allow the user to manually press on the "submit" button to submit the form. In some cases, a tooltip balloon or popup message may direct the user's attention to the widget that is used to perform the form submission.

On Step 188*c*, the filled form may be submitted in the third-party digital system. In some cases, the submission itself may be an outcome of the user's approval in accordance with the normal behavior of the third-party digital system. Additionally, or alternatively, in response to user approval detected by the DAP platform, the DAP platform may mimic user interaction with the submission button or other similar widget used to submit the filled form to the third-party digital system.

Figure 2:
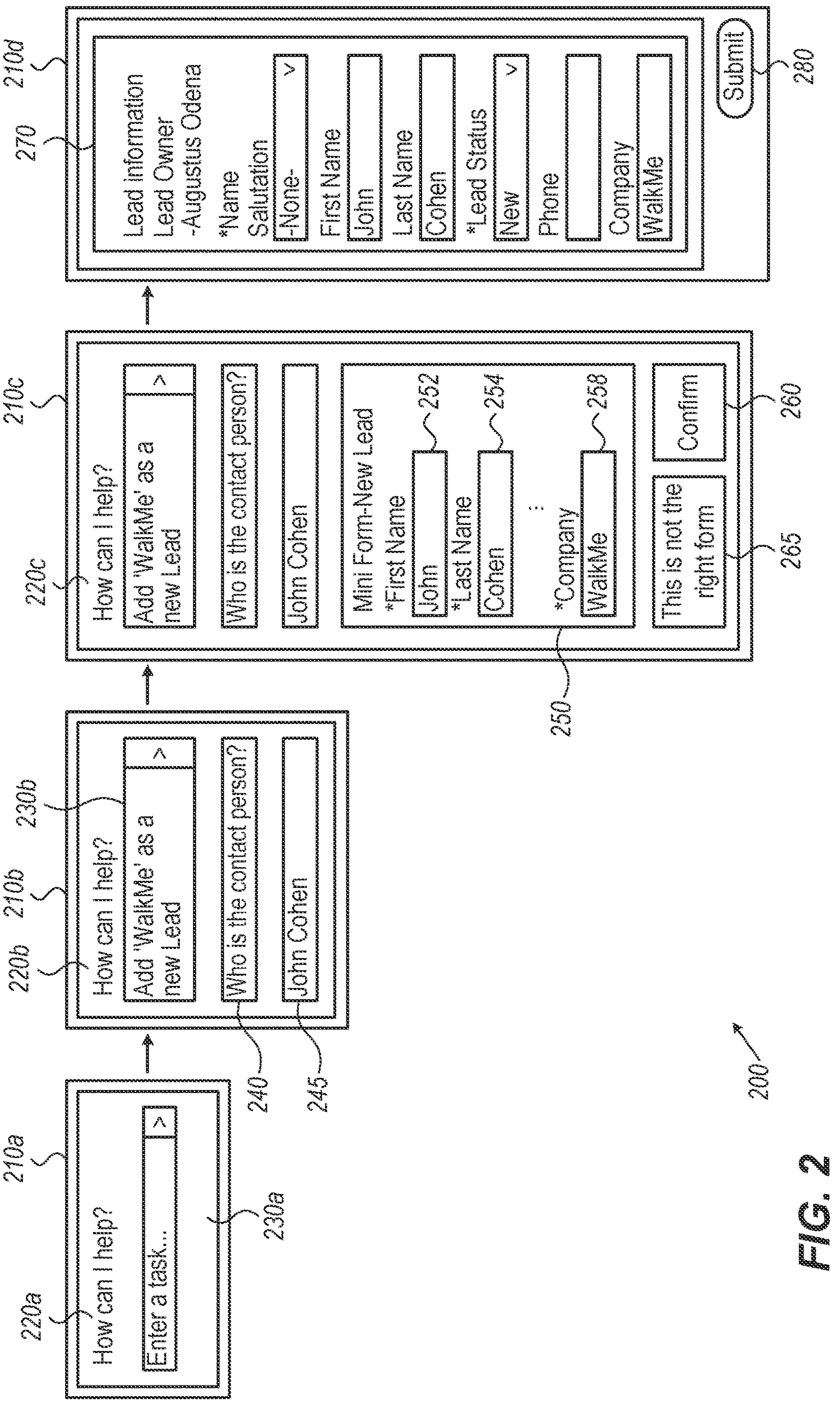
FIG. 2 shows an illustration of a User experience (UX) flow, in accordance with some exemplary embodiments of the disclosed subject matter.

Referring now to FIG. 2 showing an illustration of UX flow, in accordance with some exemplary embodiments of the disclosed subject matter.

UX Flow 200 exemplifies, according to some exemplary embodiments, the streamlined user interaction, from initiating a task using natural language to confirming the automated form submission. It emphasizes case of use and accuracy while maintaining user control and confidence in the system's actions. UX Flow 200 showcases how the system seamlessly guides users from initiating a task through natural language input to presenting a relevant mini-form, automating form completion, and ensuring user validation before final submission. The process emphasizes case of use and accuracy in task execution while maintaining user control and confidence in the system's actions.

Each of instances 210*a*-210*d* represents a stage or interaction point within UX Flow 200, where the user engages with the interface, such as a chatbot interface. The interface may be designated to be utilized by users, such as members of a certain organization, to convey tasks they want to perform, ultimately automating the submission of a digital form in one of the third-party digital systems that are used by the organization. Each instance may be a snapshot of the user's interface experience at a particular moment in the overall process, the captures the user's input, the system's response, changes in the interface's state, or the like. Different UX flows represented by different sequences of instances, may differ from one another based on the user's actions, the context of the interaction, and the system's feedback.

As an example, Stage 210*a* captures a chat initiation stage in the UX Flow 200. In this stage, the user may be prompted to provide an input, via a Chat Widget 220*a*, with a message like "How can I help?". This prompt can be triggered by interacting with a specific symbol or sign, such as a button with a "?" label (not shown). Widget 220*a* may be invoked using the button, by pressing or writing in Input Field 230*a*, or any other text entry field. It is noted that in some cases, a single input field at the bottom of Chat Widget 220*a* may be used and inputs provided thereby may be displayed in a "chat-like" interface, indicating user text and bot text in their occurrence order. In some cases, user text may be presented in a different manner than bot-text, such as aligning a text bobble to a different side of the Chat Widget 220*a* to indicate different "speakers". Stage 210*b* captures the user input stage in the UX Flow 200, in which the user provides a textual input in natural language of a desired task, such as by typing a free text description of the desired task in Input Field 230*b* of Chat Widget 220*b*. As an example, "Add 'WalkMe' as a new Lead". Other examples of prompts provided by the user may be "Add 'David Cohen' as a contact of customer 'X'", "Log a call with 'David Cohen' saying that he's thinking about buying 100 widgets", demonstrating the user's intent to add a contact or logging a call, or the like. In this stage the system may be configured to analyze the input of the user, in view of user context data about the user, and select a target form that is relevant for performing the task. The target form may be selected from a pre-existing form dataset. After finding the relevant target form, the system may determine all the relevant fields of the target form based on the textual input and the target form description. The system may be configured to utilize an organization-agnostic AI model for determining and extracting values for the fields.

It may be noted that additional iterations of user-system interactions may occur on Stage 210*b* or prior to Stage 210*c*, in which the system prompts the user to provide additional input, and the user inserts the additional input in response, by continuing its natural-language interaction with the Chat Widget 220*b*. For example, If the identified target form included mandatory fields relating to the contact person of the lead, and as no such information was provided, the system may enquire about such missing information (240) and receive user feedback completing the missing information (245). In other examples, the system may ask the user for clarification about the specific form or task, to add more details, provide additional information about the task or parameters related thereto, or the like.

Stage 210*c* illustrates a mini-form presentation within Chat Widget 220*c*. Mini-Form 250 may be displayed to the user in the natural language interface, showing the relevant fields to the task. In some cases, Mini-From 250 is presented in the middle of the chat interface, in between user inputs, bot responses, and other natural language texts. Mini-Form 250 may be a GUI widget having input fields that match at least portion of the fields of the target form selected for performing the task. Mini-Form 250 may be automatically generated by the system based on the selected target form and the fields thereof may be filled automatically based on the user input provided in Stage 210*b* (or any additional input provided in other iterations of user-system interactions prior to Stage 210*c*). It is noted that Mini-Form 250 is distinguishable and implemented on a different platform than the target form that it represents. Mini-Form 250 may be utilized for providing an output to the user indicating the target form and the determined field value, and enabling the user to manually approve automatically determined form submission.

Mini-Form 250 may comprise all or some of the fields of the target form. In some cases, Mini-Form 250 may include all relevant fields of the target form, such as all the fields that the user mentioned and additional fields that are mandatory according to the form rules. Additionally, or alternatively, Mini-Form 250 may include all forms that are utilized in the target form by users of the organization. In some cases, statistical information may be gathered about usage of the form and usage analytics may be determined. For example, percentage of forms filled and successful submitted that included each field. Based on such usage analytics, relevant fields may be determined. For example, each field that is used in more than a threshold percentage of the times (e.g., 10%, 20%, 50%, or the like) may be presented. In some cases, the threshold percentage may be user-defined by the organization's admin. Each input Field (252-258) of Mini-Form 250 may be labeled with a corresponding field name based on field names of the target form, such as "First Name" (252), "Last Name" (254) and "Company" (258). Initial values of the at least portion of the fields may be set based on the determined field values, to enable the user to review the determined field values, update, if necessary, fill unfilled fields, or the like, and authorize performing the automation. It may be noted that while some of the fields in Mini-Form 250 may be pre-filled based on the user's original input, other fields may be presented without value allowing the user to manually fill their values. For example, all mandatory fields may be presented even if the user had not provided information regarding their values. In some cases, contextually-important fields may also be included regardless if the user had provided relevant information regarding their values. Additionally, or alternatively, all commonly-used fields (e.g., fields used in more than a predetermined threshold percentage of the submissions of the target form according to usage analytics) may be displayed. Mini-Form 250 may comprise a user intractable authorization Button 260 configured to indicate the user confirmation, or a user intractable de-authorization Button 265 ("this is not the right form") configured to be utilized by the user to reject the selected form, to indicate that the selected form is not suitable for the desired task, e.g., Mini-Form 250 is related to a wrong form, the user's task is not related to selected form, or the like. Providing de-authorization Button 265 may ensure responsible AI practices, and enable replacing the target form if a wrong form is selected and user intention is misinterpreted by the computational model utilized to select the target form. In some cases, in response to pressing the de-authorization Button 265, the system may attempt to select an alternative form, such as by re-using the computational model utilized to select the target form.

Additionally, or alternatively, in case of uncertainty of the target form, alternative mini-forms that are compatible with the user's query may be displayed or suggested to the user. As an example, the most likely target form may be represented in Mini-Form 250, while other possible forms may be presented as headers or other interactable widgets that when clicked causes a corresponding mini-form to open, while collapsing the currently revealed mini-form to a header-only view. The order of forms may be from top to bottom based on their likelihood to meet the user's intention based on the user's input (e.g., confidence measurement provided by the computational model in its prediction), based on the user context data, the fields the user requested to fill and other data of the existing forms such as the popularity of the forms, the number of matching corresponding fields, or the like. Additionally, or alternatively, the multiple mini-forms may be displayed equally or simultaneously. The user may be enabled to selectively switch between different mini-forms and selecting the required target form. If the suggested form is correct, and after the user confirmed, completed or corrected the field values, the user can confirm the submission using authorization Button 260. The system may be instructed to automate form filling in the third-party digital system. The automation may be configured to reach the target form in a third-party digital system and fill-in the determined field values automatically in the GUI of the third-party digital system. In some cases, the authorization Button 260 may be enabled only if the filled information would satisfy the fill requirements of the target form, e.g., all mandatory fields are filled, values are in accordance with pre-defined data types and all constraints between values of fields are held. In response to submission of the target form, the authorization Button 260 may become disabled, the user may be prevented from additional interaction with Mini-From 250.

Stage 210*d* may be a form automation stage that may be reached in the UX Flow 200 upon the user approval of the form via Mini-Form 250 in Stage 210*c*. In Stage 210*d* the system automatically navigates to the target Form 270 within the third-party digital system and updates values of the fields according to the confirmed content of Mini-Form 250 within the Chat Widget 220c. In some exemplary embodiments, the system may then prompt the user to approve the submission of the form, providing a final validation step to ensure accuracy before the automation completes the form submission, such as via Submit Button 280. It is noted that Submit Button 280 may be part of the third-party digital system. Hence, even without explicit prompt, final user validation is provided before the information is submitted. In some cases, a dedicated tooltip that is not part of the third-party digital system may be injected thereto by the system to prompt the user to click on the submit button. Additionally, or alternatively, the system may automatically click on the Submit Button 280 as part of the automation process, either automatically, or after user approval in a separate dialog box that is not part of the third-party digital system and is injected thereto by the system.

As may be appreciated, the lead information in the Target Form 270 is the same as within the Mini-Form 250. In some cases, Target Form 270 may include additional fields and information (e.g., "Phone" field, "Salutation" field, Lead Owner information ("Augustus Odena")), or the like.

Referring now to FIGS. 3A-3I showing illustration of an exemplary user interface interactions and for Conversational interfaces, in accordance with some exemplary embodiments of the disclosed subject matter.

Figure 3A:
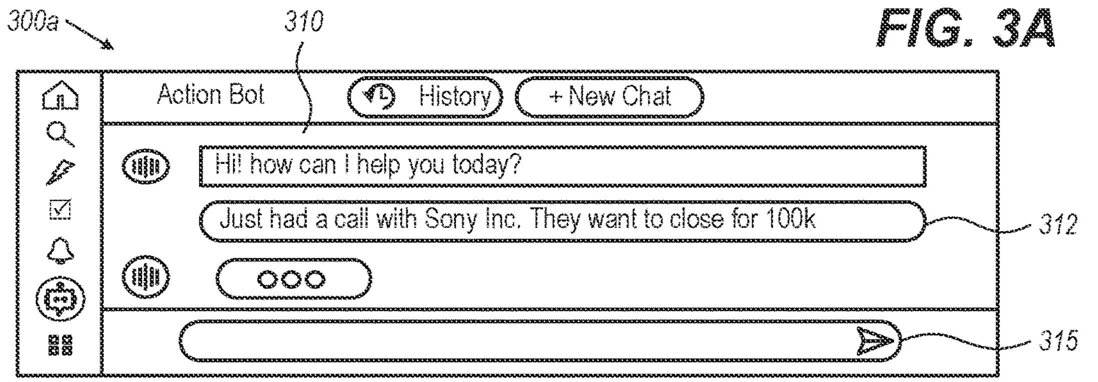
Figure 3B:
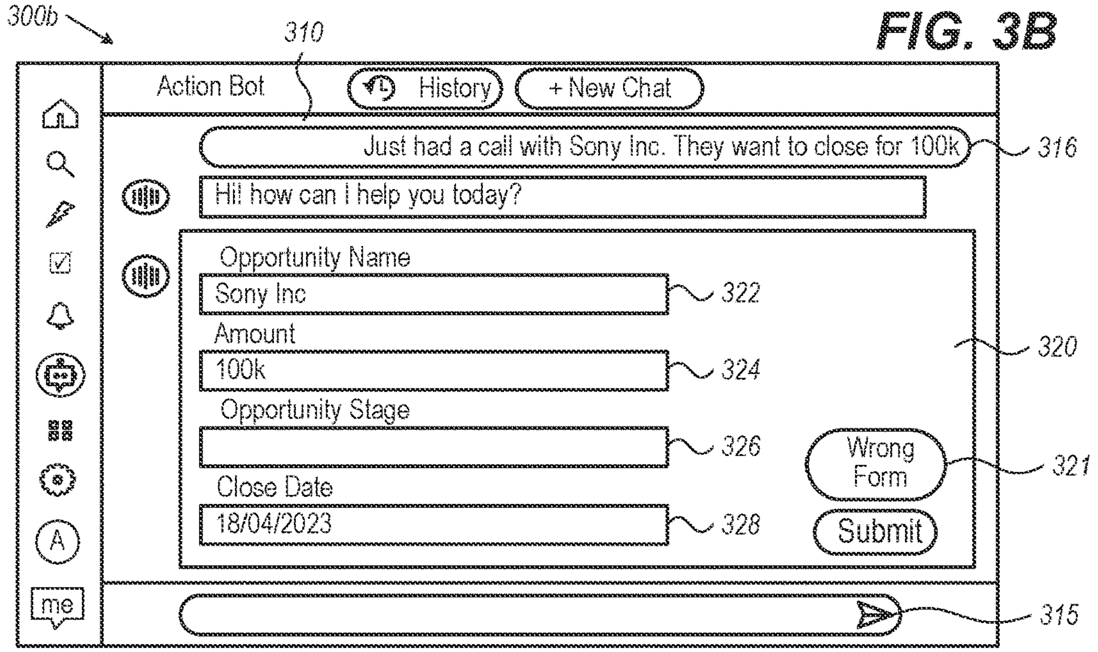
Figure 3C:
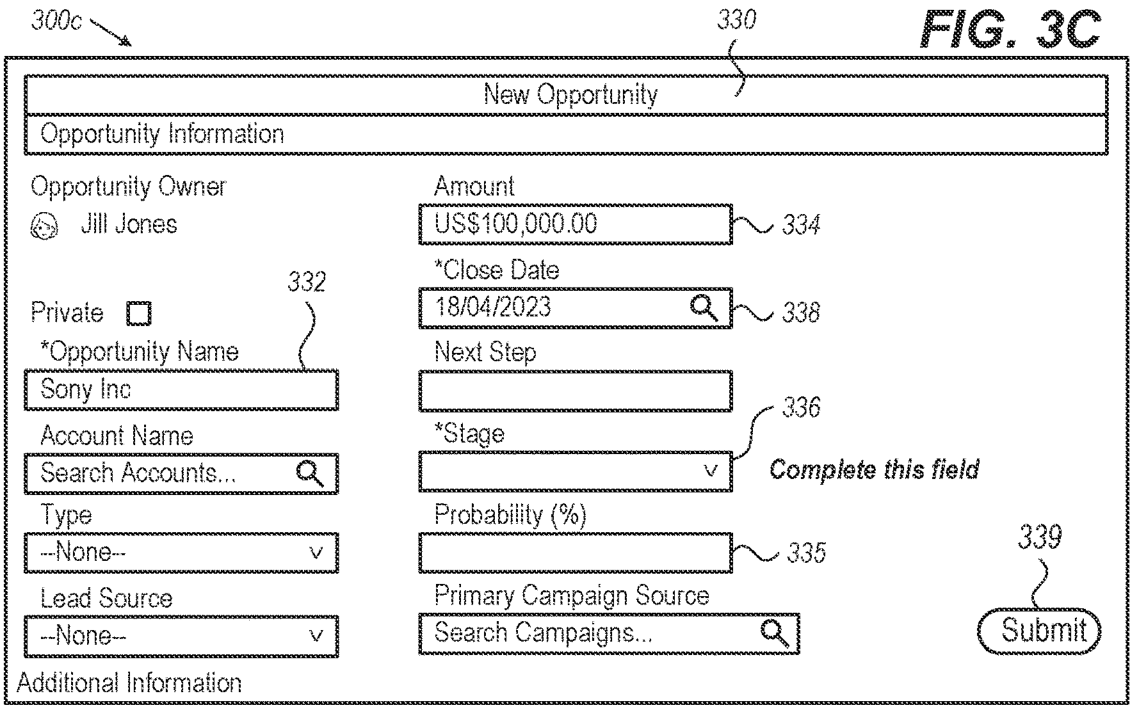
Figure 3D:
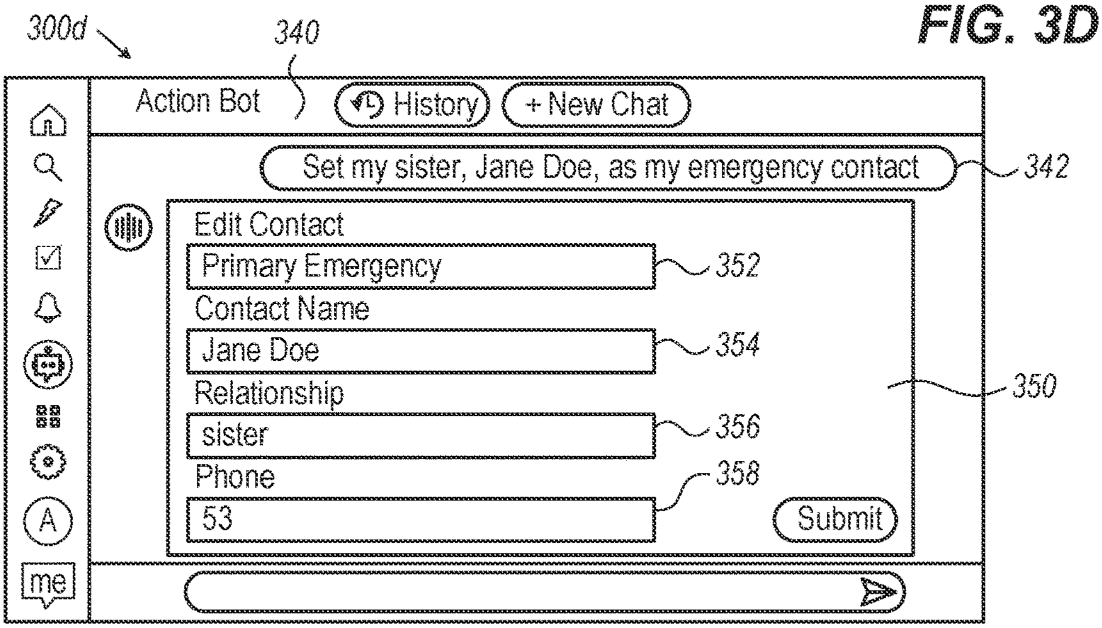
Figure 3E:
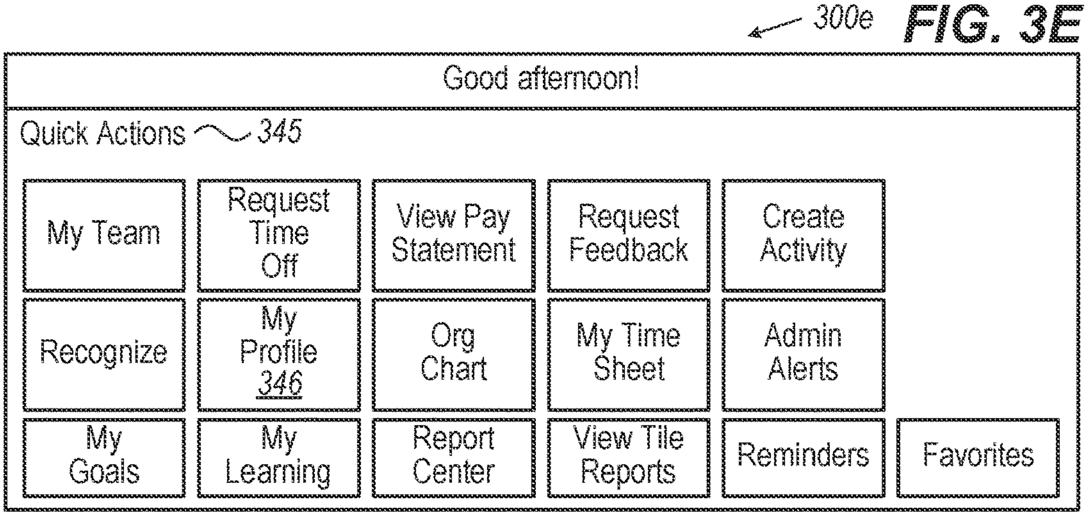
Figure 3F:
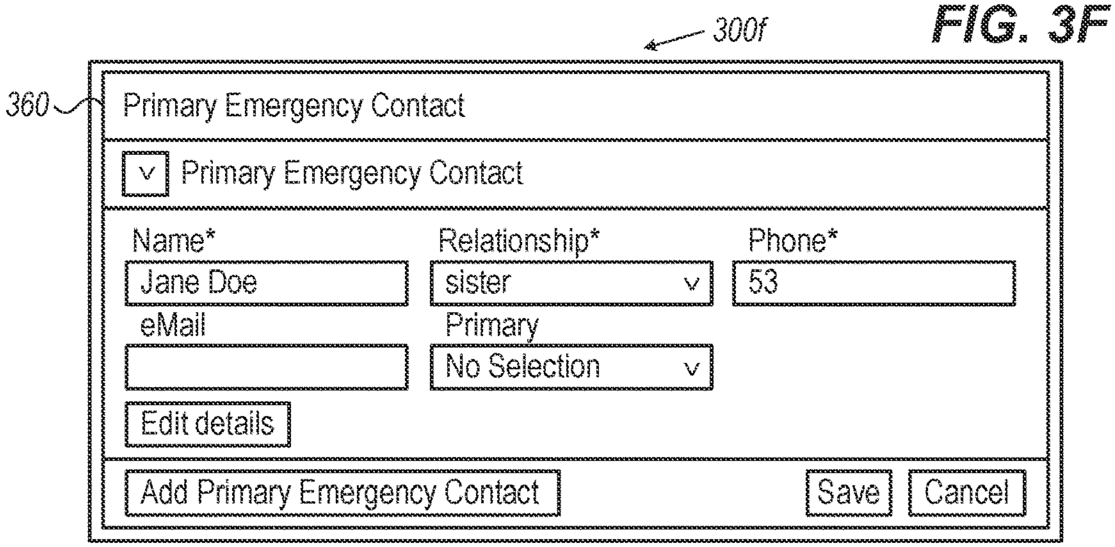

FIGS. 3A-3C show illustration user interfaces of a first example of a user requesting to perform a task of adding a sales opportunity. FIGS. 3D-3F show illustration user interfaces of a second example of a user requesting to perform a task of setting an emergency contact. The second example is in a Single-Page Application (SPA), which is implemented as a single web-page whose content is updated dynamically and without providing the ability to reach each specific form directly via a URL. FIGS. 3I-3H show illustration user interfaces of a third example of a user requesting to perform a task of reporting a device malfunction.

In some exemplary embodiments, the user (or users in case of different users) may initiate a conversation interface to request to perform the desired ask. The user interfaces in each of the examples (e.g., User Interface 300a, 300d or 300g) may be initiated via the same system, such as via a native app installed on the user's device, via a client-side code in a web page (that is inherent to the webpage or injected by a browser extension), or the like. Each user interface may be initiated using a different means, such as by typing text via a chat widget embedded in the website, via a chat widget embedded on the desktop, by speaking to a microphone, or the like. As another example, third party chat platforms, e.g., SLACK®, WHATSAPP®, or the like, may be utilized, by the user to provide the request. In some exemplary embodiments, such third-party chat platforms may be utilized during the automation process, in which the target form is being filled and submitted. The third-party chat platforms may be utilized for reaching the forms, authorizing submission of the forms, or the like.

In some exemplary embodiments, the user interface used for the conversation (e.g., 300a, 300d, 300g) may be separate and distinct from the third-party digital system in which the target form (330, 360, 390) is implemented.

The conversation interface (e.g., User Interface 300a, 300d, or 300g) may enable the user to converse in natural language to instruct the system to perform a task.

Referring now to FIG. 3A, User Interface 300a may prompt the user via Action Bot 310: "Hi! How can I help you today?". The user may utilize a free-text input field (315) to submit text in natural language, imitating look-and-feel of a chat conversation with a human. As can be seen, the user had stated: "Just had a call with Sony Inc. They want to close for 100K" (Text 312), indicating an intent to create a new opportunity regarding Sony Inc. for 100K USD. In some exemplary embodiments, the system may perform intent recognition of the user. The intent may be derived from the user's prompt using AI model, such as LLM model.

Referring now to FIG. 3B, in view of the user's text (Text 312), User Interface 300b introduces a Mini-Form 320. Mini-From 320 is a representation of a target form in a third-party digital system, which is implemented in Action-Bot 310 and not in the third-party digital system. The target form is determined in view of the user's intent, as deduced from the user's input.

In some exemplary embodiments, a computational model (such as GPT, LLM, or the like) may be utilized to analyze the request of the user and optionally the context of the request and user characteristics. The computational model may be configured to calculate one or more matching forms for the user. Optionally this calculation may be done by comparing embeddings of forms previously collected and the current user query (such as in accordance with form retained in Form Dataset 560 in FIG. 5B, or Form Dataset 430 in FIG. 4). In case the computational model is not sure which form is the exact target form that matches the user's request (e.g., prediction with a confidence measurement below a predetermined minimal threshold), or cannot select a best form from a plurality of matched form (e.g., a plurality of potential predictions with a confidence measurement above a predetermined minimal threshold and with confidence measurements within a predetermined range of one another), the system may ask the user more questions via the user interface, providing more details, specifying the request, or the like, until the computational model can confidently select a single target form. In some cases, in case of a plurality of optional forms, the best match may be selected (e.g., highest confidence measurement).

It may be noted that the AI models utilized by the system may be dynamically updated based on the collected data, based on properties of the user, based on the organization from which the user provides the request, or the like. The selection of the form by the computational model may be determined based on the input provided by the user and characteristics of the user. Referring to the first example in FIG. 3A, the selection of the form may be performed based on analysis of the user's input "close for 100K" means closing an opportunity for 100,000 USD. The computational model may infer such information in view of the user's role of "sales representative", in view of past interactions with the user and similar users, or the like.

In some exemplary embodiments, the selection of the form may be performed based on user context data of the user, such as the department of the user, the location of the user, what forms the user uses in this location and timing, or the like. The computational model may identify the target form in a third-party platform that is in line with the user context data of the user. The user context data may be important for extracting intent of the user, as a same statement me exhibit different intent in view of different user context data. As an example, the text "add a contact person" may be inferred as relating to updating a lead contact information if written by a sales representative, and as relating to updating employee contact information if written by an HR specialist, each of which may be directed to a different form, potentially in a different third-party digital system.

The initial values of the fields of the Mini-Form 320 may be determined in view of the user's input as well.

In some exemplary embodiments, a second AI model, or any other computational techniques may be utilized to determine initial values of the fields based on the user input, user context data, or the like. It may be noted that the system may show a mini-form that shows only a portion of the fields of the target form, such as only mandatory fields, only contextually-important fields, only commonly-used fields, a combination thereof, or the like. Additionally, or alternatively, the system may decide to ask the user to fill additional fields that are not mandatory according to the analysis, however are detected to be popular fields, fields with an added value, or the like. The mini-form displayed by the system may comprise such fields in addition to the mandatory fields. Additionally, or alternatively, the mini-form may comprise additional fields related to data referred to in the query, despite not being mandatory, indicate such information to the user, or the like. It may further be noted that fields being displayed to the user in the mini-form may be guaranteed to be part of an actual form that has been viewed in production, while preserving the labels of such fields.

Additionally, or alternatively, the fields that are shown in the mini-form that represents a specific target form may be defined manually by an admin user. In some cases, based on user input, values of fields of the target form may be determined. In such a case that a certain field is assigned a value in view of the user input; such field may be presented within the mini-form.

In some cases, some initial values may be determined even without explicit user statement. For example, Text 312 may explicitly indicate value for Opportunity Name Field 322 and of Amount Field 324. Text 312 may implicitly indicate value of Opportunity State Field 326—indicate a specific stage, when applicable. Additionally, or alternatively, Text 312 may be silent regarding the close date. However, in view of external information, the closing date may be determined, such as in view of date in which Text 312 was written. In other examples, information may be extracted based on the active user (e.g., user's name, user's contact information, etc.).

As can be appreciated, the Opportunity Stage Field 326 is provided without an initial value. The user may update the values of any of the mini-forms fields—both fields that are assigned with an initial value and fields for which no initial value was determined.

In some exemplary embodiments, the content of the fields of Mini-Form 350 that cannot be determined automatically based on the user input or the available metadata (e.g., user context data and information of the target form), or fields of Mini-Form 350 that are not determined by the fields of Mini-Form 350, may be displayed in the mini-form without having an initial value. In some cases, such fields may be marked as expected to be filled in the user's context even if the prompt did not indicate their value. Additionally, or alternatively, the content of such mandatory fields may be set to a default value based on usage analytics of Form 330. For example, usage analytics may include statistical information regarding values of different fields in form submission over time. Based on such information, a value may be estimated. For example, it may be determined that in 90% of similar form submissions of Form 330 (e.g., submissions by similar users in similar context), the value of Opportunity Stage 326 is "Closing", and such value may be set as the initial value. The default values may be determined based on analysis of previous form submissions, as an example, if users similar to the user have been using a specific value in over 90% of the cases, that value can be utilized as a default value; any other predetermined threshold may be used, such as 30%, 50%, 70%, 95%, or the like.

It may be noted that fields of Mini-Form 320 may correspond to actual fields of the target Form 330 (e.g., Fields 322, 324, 326, 328 in Mini-Form 320 correspond to Feilds 332, 334, 335, 336, 338 in Form 330).

The user may interact with Mini-Form 320 to update the values. In some cases, the user may user Free-Text Input Field 315 to provide additional information that may update the Mini-Form 320 values. In some cases, if the user provides additional natural language input, Mini-Form 320 may continue to be displayed at the end of the chat history section as long as Mini-Form 320 is active and can be submitted. Additional texts and feedback may appear, for example, above Mini-Form 320.

If the Mini-Form 320 relates to incorrect target form, "Wrong Form" Button 321 may be utilized. The system may receive negative feedback on its suggestion which may be utilized to improve the model in the future. Additionally, or alternatively, a different form may be selected automatically. Additionally, or alternatively, a plurality of potential forms may be determined, and the user may select therebetween. It may be noted that in some cases, natural language input using Free-Text Input Field 315 may be provided as an alternative manner of changing the Mini-Form 320 to relate to a different target form.

Once the user is satisfied with the content of Mini-Form 320, the user clicks on Submit Button 329. In some exemplary embodiments, Submit Button 329 may only be clickable if all fill requirements of Target Form 330 are fulfilled by content of Mini-Form 320 (e.g., all values are within respective ranges, all mandatory fields are non-empty, or the like).

In response to the user clicking on Submit Button 329, an automation process may be executed to cause the third-party digital system to reach Target Form 330 and fill content of the fields of Target Form 330 according to values in Mini-Form 320. The automation process may mimic user interaction with the GUI of the third-party digital system and may avoid using dedicated API of the third-party digital system. Target Form 330 may comprise fields that have no corresponding fields in Mini-Form 320, such as "Account Name", "Type", "Lead Source", "Next Step", Probability Field 335, or the like. In some cases, some of such fields may be filled automatically in the automation process or be set in view of user's context, such as "Opportunity Owner" field, which may be determined based on active user in the third-party digital system under whose account the automation is being executed.

Figure 5A:
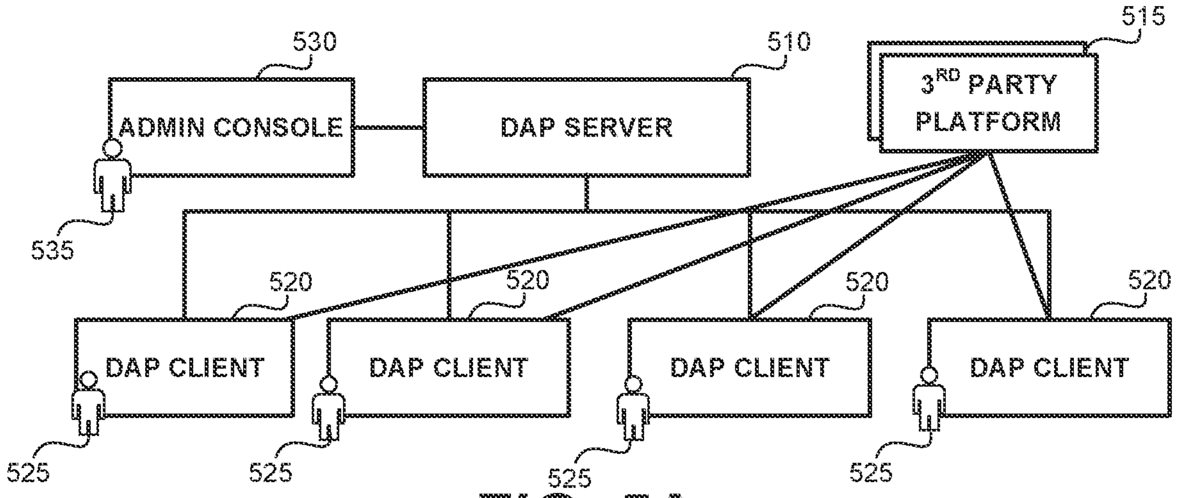
FIGS. 5A-5C show schematic illustrations of a system, in accordance with some exemplary embodiments of the disclosed subject matter.
Figure 5B:
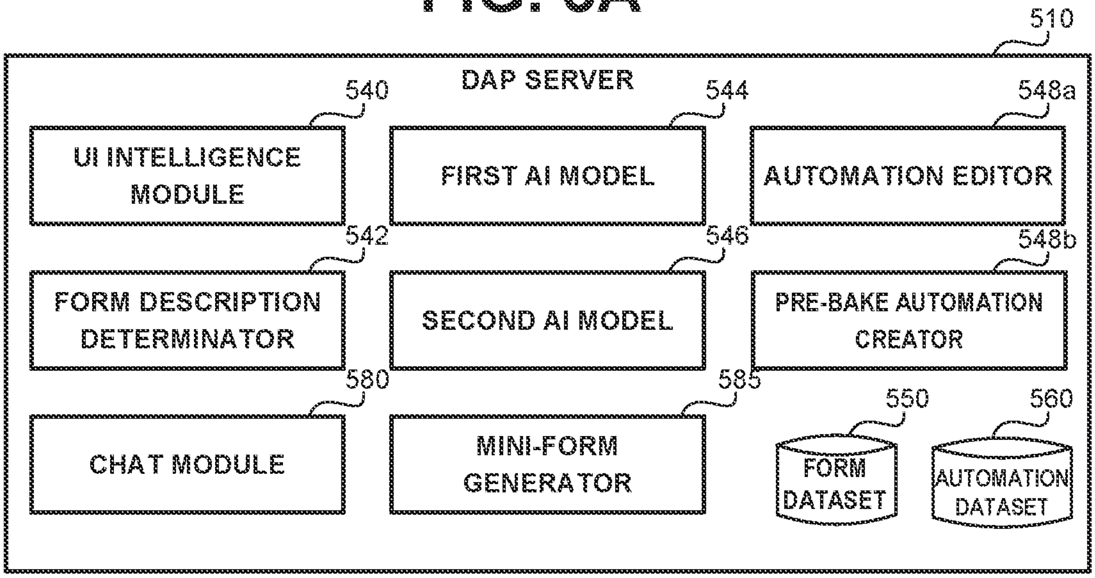

In some exemplary embodiments, the automation process may be performed, such as by Automation Player 575 in FIG. 5B. The system may be enabled to reach the forms (e.g., based on information retained in forms dataset) in third-party digital systems. The system may further be enabled to set values in the forms automatically, by mimicking user interaction with the GUI. The advantages of GUI automation may be that it is transparent to what the user is going on. In addition, it does not require any integration and can work out of the box. It may also use the user's session to makes sure the system is doing only what the user is allowed to do. In some cases, in addition to setting the values in the target form, the GUI automation may also but not necessarily interact with a submission button within the GUI. Additionally, or alternatively, an API automation may be performed. API automation may be performed by invoking API calls to effectuate the automation. In some cases.

API automation may be used as an alternative when GUI automation is not possible, for example when using mobile, or when GUI is not available. In some cases, if acquisition of a GUI element fails, the GUI automation may fail, and API automation may be attempted as an alternative.

In some exemplary embodiments, after filling Form 330, Form 330 may be displayed to the user for additional review, for confirmation, or the like. Form 330 may be displayed in the designated platform (e.g., the third-party platform in which the form is being submitted), which may present the GUI form to the user on a screen or a web page. Form 330 may contain input fields where users can enter textual (332), numerical data (334, 335), dates (338), enumeration values (336), or the like. Additionally, or alternatively, the presented GUI forms may include dropdown menus, checkboxes, radio buttons, or the like, to present a set of predefined options. The third-party digital system may enable a user to select a single option from a radio button or choose multiple options using checkboxes, amend some automatically filled fields, or the like. The system may set the value in an automation.

In some exemplary embodiments, the system may enable the user to perform additional changes in the target form directly via the third-party platform. Additionally, or alternatively, the user may not be required to interact with the third part platform, except for final confirmation, such as by clicking a "Submit" button 339. This action triggers the processing of the form data within the third-party digital system. Additionally, or alternatively, the submission may be performed automatically or directly without requiring additional action from the user.

In some cases, validation checks to the form may be performed before processing the form, the system may perform validation checks to ensure that the provided information is valid and complete. The system may be configured to verify if required fields are filled, validate email addresses or phone numbers, enforce specific data formats, or the like. After the form data is submitted and validated, the platform can utilize the provided information to perform various actions or tasks. This can include updating a user's profile, saving preferences, executing a search query, making a purchase, initiating other processes based on the platform's functionality, or the like. As is exemplified in FIG. 3C, Stage field 336 may be a mandatory field, and the third-party digital system may prevent submission of the form data prior to completion of the data in this field.

In some exemplary embodiments, the system may be configured to provide feedback to the user after form submission, such as displaying success messages, error notifications, redirect users to relevant pages based on the action performed, or the like.

It is noted that the disclosed subject matter is not limited to a single page form. In some cases, a complicated entity may require filling fields of the forms in several screens in order to be submitted. The disclosed subject matter may compact the required information into a single mini-form that represents information to be filled in different screens as part of a single task. When the GUI automation is implemented, the several different screens are filled. The user may be requested to verify each screen before the information is submitted in that screen. Alternatively, the information may be submitted in all the screens automatically except for the last screen, in which the user may validate and authorize the final submission.

Referring to the second example, FIG. 3D illustrates a Mini-Form 350 provided within a Chat Widget 340. In response to user provided Input 342, it may be determined that the user's intent is to use Target Form 360 in an HR-related third-party digital system. Mini-Form 350 may be presented and based on the information provided in Input 342, initial values of some fields may be determined. For example, Contact Name Field 354 is determined to be "Jane Doe", a named explicitly mentioned in Input 342. Similarly, Relationship Field 356 is also explicitly mentioned in Input 342. Type of Contact field 352 is also given a value based on usage analytics, as most users edit only their primary emergency contact. Phone Field 358 may be automatically set based on the user's address book and contacts in his mobile phone or another digital repository.

In some exemplary embodiments, additional information that is not provided directly by the user, such as the full name of the emergency contact, the phone number, or the like, may be extracted based on data of the user, including user context data of the user (e.g., dialing 53 when calling "Jane"), or data of the user in the organization (e.g., the user's profile), or the like. Additionally, or alternatively, the system may be configured to understand what parameters are missing and ask the user to provide them. This can be in a form of a conversation with the user, e.g., directly asking the user "What is your sister's name?", or by enabling the user to interact with via Mini-Form 350.

In response to user submitting Mini-Form 350 using Submit Button 359, the system may execute an automation which may access the third-party digital system. The system may interact with User Interface 300*c* of the third-party digital system, reaching Quick Actions Page 345, and from which clicking My Profile Widget 346 to reach Form 360, shown in User Interface 300*f* of FIG. 3F. The system may automatically set the values of the fields based on corresponding fields in Mini-Form 350.

As can be appreciated, Reaching Form 360 may require navigation internally within the third-party digital system. This may be the case in native applications, as opposed to web-based applications in which a form may often be directly reachable via a specific URL or URI.

Referring now to the third example, in which a user writes "My keyboard is not working properly" (372). Based on this input, the system identifies the relevant target form (390) and opens a Mini-Form 380 within the same chat widget the user uses. As can be appreciated, the system understands the type of IT Ticket request (382) in view of the user's input. Requester's name (384) is determined in view of the identity information of the user using the chat widget. In response to Mini-Form submission (389), automation process implements navigation in the IT ticketing system (FIG. 3H), until reaching Target Form 390 (FIG. 3I). Values are automatically set in to Form 390 based on the values of Mini-Form 380. For example, Requester Field (394) is set according to the information in Mini-Form (Field 384) and ticket type (Field 392) is set based on information in Mini-Form (Field 382).

Figure 4:
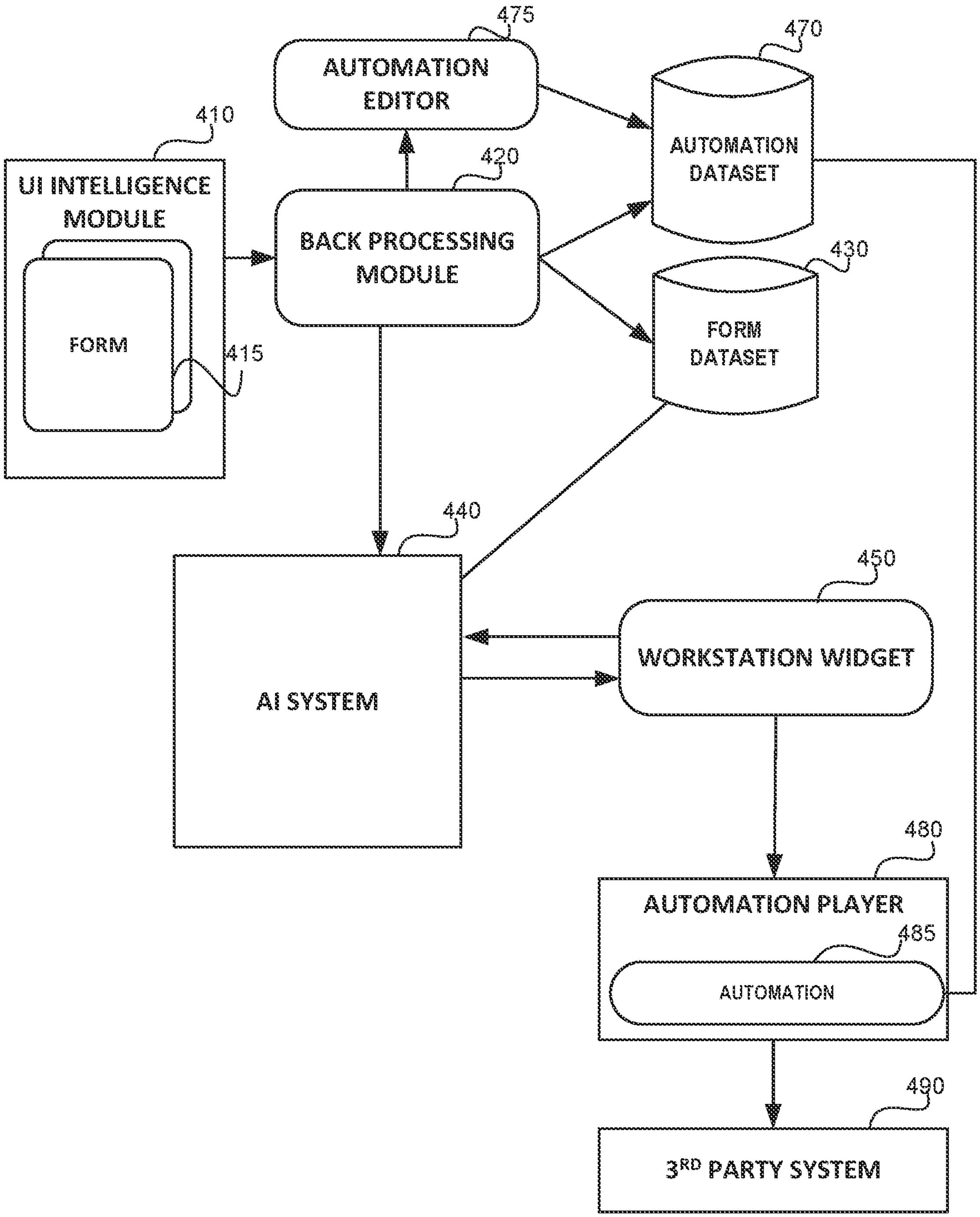
FIG. 4 shows a schematic illustration of an exemplary environment and architecture, in accordance with some exemplary embodiments of the disclosed subject matter.

Referring now to FIG. 4 showing a schematic illustration of an exemplary environment and architecture in which the disclosed subject matter may be utilized, in accordance with some exemplary embodiments of the disclosed subject matter.

In some exemplary embodiments, UI Intelligence (UII) Module 410 may be configured to collect and record multiple schemes of Forms 415, and monitoring actions performed thereon by different users. In some cases, UI Intelligence Module 410 may be configured to collect statics and usage analytics of various forms implemented multiple third-party digital systems, which users of the organization utilize to perform tasks. In some cases, UI Intelligence Module 410 may be implemented with or without use of AI techniques for understanding the forms. For example, in some cases, each third-party digital system may have a specific template for forms, such as aggregating elements of the form using specific elements, giving specific names to input fields and their associated textual labels, or the like. Based on such templates, using static analysis of the presented pages, the existence and content of a form may be identified even without the use of AI techniques. In some exemplary embodiments, Form analysis may be based on computer vision, based on Document Object Model (DOM) analysis, or the like. Additionally, or alternatively, analysis technology that has platform-specific knowledge of the underlying platform may be utilized to supports specific platforms, such as SALESFORCE®, WORKDAY®, or the like. In some cases, a Language Model for Dialogue Applications (LaMDA) model or using other one or more large language models (LLMs), such as GPT4, may be utilized to analyze and extract information about GUI form.

In some exemplary embodiments, UI Intelligence (UII) Module 410 may be configured to analyze and understand a group of elements, such as an entire form, a portion of a form, or the like. UI Intelligence (UII) Module 410 may analyze and learn that the screen of the user is working on is a form. UI Intelligence (UII) Module 410 may identify several separate screens as relating to a single form, such as in case of tabs, separate form sections in separate pages, or the like. UI Intelligence (UII) Module 410 may be configured to analyze the metadata of the form, such as the title of the form (e.g., "Create a new lead"), fields in the form (e.g., "First Name", "Last Name", "Phone Number"), the type of value of each field (e.g., text, number, date, or the like), which the fields are mandatory and which are optional, or the like.

In some exemplary embodiments, UI Intelligence Module 410 may be configured to understand specific elements of each form. UI Intelligence Module 410 may be configured to recognize single elements, such as a "submit" button, a "name" field, or the like; and analyze the user interaction with these elements. UI Intelligence Module 410 may be configured to perform the analysis based on the GUI representation of the form, by acquiring the different GUI elements of the form in the GUI display.

In some exemplary embodiments, UI Intelligence Module 410 may be configured to collect user context data about the user. The user context data may be useful for determining usage analytics that are relevant to a specific user or specific context.

In some exemplary embodiments, each Form 415 may represent a GUI form (not shown) used to collect or display information in a structured manner within a third-party digital system. Each GUI form represented by Form 415 may include input fields, checkboxes, radio buttons, dropdown menus, buttons, and other interactive components that allow users to interact with a designated platform. Each form GUI may be designed to provide a user-friendly way to gather specific information or trigger actions within a software application or digital platform. Users can input data, make selections, and perform actions by setting values, filling out or interacting with the form elements. Each form may be configured to streamline user interactions by providing a structured and intuitive interface for data input and action triggering, while enhancing user experience, reducing errors, and ensuring consistent data collection across the designated platform.

In some exemplary embodiments, UI Intelligence Module 410 may be configured to collect for each GUI form, Form 415 data that may include scheme of the GUI form, instances of inputted data to the GUI form, form usage information, statistical measurements, or the like. Form 415 may include an identification of the relevant third-party digital system in which the form is implemented. Additionally, or alternatively, Form 415 may include a manner of reaching the GUI form in the third-party digital system (e.g., URL to a specific web-page, an automation process that can reach the GUI form, a sequence of steps to be implemented to reach the GUI form, an API call that would cause the GUI to display the form, or the like). Form 415 may include the scheme of the form (e.g., fields and corresponding names thereof, corresponding types thereof, or the like). Additionally, or alternatively, Form 415 may include instances of inputted data thereto and other information regarding submission of such forms. In some cases, there may be a distinction between the form scheme and the input provided in the monitored instance. It is noted that the information regarding the filling or submission of the forms may include, for example, values inputted to each field, invalid values inputted to each field, amount of time it took the user to fill each field, whether the form submission was successful or not, fields that caused the form submission to fail, or the like.

In some cases, the Forms 415 may be a set of metadata information about the GUI forms that include the data collected and potentially include information derived based thereon. In some cases, frequency of usage of fields may be computed (e.g., with respect to all usages or to usage in a specific context). Additionally, or alternatively, mandatory fields may be identified and noted in Form 415 data.

In some exemplary embodiments, UI Intelligence Module 410 may be configured to collect fill-requirements of forms and fields thereof. In some cases, the fill-requirements may be implemented by the Digital Adoption System (not shown) and extracted therefrom. Additionally, or alternatively, fill-requirements may be deduced from the identified legal and illegal values.

In some exemplary embodiments, Back Processing Module 420 may be configured to analyze Forms 415, interaction of users therewith, or the like. As an example, Back Processing Module 420 may be configured to classify types of forms to certain users, identify frequent mistakes users perform when interacting with the form, identify contextually-important fields, identify commonly-used fields, or the like. In some exemplary embodiments, Back Processing Module 420 may be configured to apply a generic GUI understanding technology for analyzing Forms 415. Form analysis may be based on computer vision, based on DOM analysis, or the like. Additionally, or alternatively, analysis technology that has platform-specific knowledge of the underlying platform may be utilized to supports specific platforms, such as SALESFORCE®, WORKDAY®, or the like. In some cases, Back-Processing Module 420 may be configured to utilize a Language Model for Dialogue Applications (LaMDA) model or using other one or more large language models (LLMs), such as GPT4.

In some exemplary embodiments, Back Processing Module 420 may be configured to analyze information gathered by UI Intelligence Module 410 and extract usage analytics. Additionally, or alternatively, Back Processing Module 420 may be configured to provide actionable user behavior analysis that drives digital transformation to meet target goals. Back Processing Module 420 may be configured to identify trends in form usage over time to understand the impact of changes. Additionally, or alternatively, Back Processing Module 420 may be configured to analyze how users are interacting with the forms, provide charts and information using the data that was collected by UI Intelligence Module 410, or the like. Back Processing Module 420 may be configured to provide insights on how certain forms are being filled in certain systems or platforms, to achieve or perform a certain task or action. Such insights may be utilized by Automation Editor 475 to generate automations to be stored in Automation Dataset 470.

It may be noted that Back Processing Module 420 is configured to perform the analysis and processing services offline. Such offline processing service may be configured to create list of elements and elements for all the forms that were analyzed. In some cases, UI Intelligence Module 410 offline processing service may create automation logic that can be used later on, with respect to the forms, fields of the forms, or the like, such as when performing the automation of submitting forms in Third-Party Platform 460.

In some exemplary embodiments, Forms 415 and the respective analysis thereof may be stored in Forms Dataset 430 and/or in Automation Dataset 470 or in other servers of the system or organization, along with metadata of the form. It may be noted that each organization may be associated with its own Form Dataset 430, that comprises form descriptions of forms that are utilized by the organization. The form description relating to a form comprises names of fields of the form, fill requirements, description of the task carried out by the form, or the like. An identifier for each form may be formed as any function related to its titles, headers, and fields. Specifically, an embedding of some of this information can be useful for future retrieval. In some embodiments, only non-private information is collected and stored to preserve privacy of the users.

In some exemplary embodiments, the form description may be determined based on metadata of the form as collected by Back Processing Module 420. The metadata may comprise usage analytics of the form, such as what fields of the form were actually filled, in what order, the time it took to fill each field, in what fields there were errors, what error(s) did the user see, the total time required to finish the form, or the like. Additionally, or alternatively, the metadata may comprise an expected usage level of each field. The expected usage level of a field may indicate that a field is a mandatory field and must be filled in order to complete the task or submit the form. The expected usage level may indicate the field is a non-mandatory field but is often used. In some cases, the expected usage level may be a general indication, such as with respect to all potential users of the system. In some cases, the excepted usage level may be a context-based expected usage level, indicating expected usage of similar users to the current active user (e.g., popular fields for sales representatives may be different than popular fields of managers or HR representatives). In some cases, context-based expected usage level may indicate sets of fields that are often filled together, indicating that if a first field is filled, a second field is likely to also be required to be filled (e.g., ZIP Code is usually accompanied by other address fields; first name is usually accompanied by last name; a department name field is usually accompanied by a role field; or the like). Additionally, or alternatively, the metadata may comprise context of filing the form and user data. The context may be, for example, a time of day on which the form is filled, day of week, location, previous screens/process used that led to this form, or the like. The user data may comprise characteristics of the user related to the form, such as department within the organization being managed (e.g., sales, finance, or the like), role (e.g., manager, accountant, or the like), geographical location of the department (e.g., US, EMEA, or the like), or other characteristics that associate the user with the form.

In some exemplary embodiments, in order for a GUI form to be automatically filled, an automation process that is capable of reaching the form and filling the relevant fields (e.g., as exemplified in FIGS. 3A-3I) may be required. In some cases, Back Processing Module 420 may invoke Automation Editor 475 to create and publish a pre-baked automation of submitting a form for each Form 415. In some cases, the pre-baked automation may be automatically created to cause the system to reach the GUI form, traverse all its fields and input value to each field based on a provided parameter. The automation may be stored in Automation Dataset 470. In some cases, each automation may have access privileges. Once the automation is published, it may be made available for client devices to be retrieved and utilized (assuming they have appropriate access privileges). It is noted that the automatic creation and publication of automations may be important for scalability purposes, as it may be hard for an admin to create automations for all potential forms. In some cases, the pre-baked automation may be a template automation that is capable of implementing automatic submission of any forms (or forms of a specific type) within a specific third-party digital system. For example, a single pre-baked automation process may be generated for SALESFORCE®. The automation may receive as parameters the form identifier and the values to be filled in the fields, thereby allowing the disclosed system to handle any new form identified in this specific third-party system (SALESFORCE®).

It is noted that using Automation Editor 475 an admin user may manually create automations. The admin user may link an automation to a specific form or to a group of forms for which the automation is applicable. In some exemplary embodiments, From Dataset 430 may include for each form an identifier of an automation in Automation Dataset 470 that is applicable to fill the relevant form. In some cases, the admin user may update an automation that was automatically created. The admin user may improve the automation if it does not function properly or as the admin user wants it to operate. In some cases, the admin user may unpublish a published automation and edit it.

In some exemplary embodiments, submission data collected and analyzed by UI Intelligence Module 410 and/or Back Processing Module 420 may be utilized by Automation Editor 475 to generate automations for submitting the forms and store the automations in Automation Dataset 470. Automations associated with submitting a certain form, a class of forms, or the like, may be saved in Automation Dataset 470 such that it would be possible to easily retrieve the respective automation for each form given a query.

In some exemplary embodiments, AI System 440 may be configured to provide AI capabilities to Workstation Widget 450. In some exemplary embodiments, AI System 440 may employ a computational model for selecting an appropriate form from Form Dataset 430 in view of user context and user provided input. In some cases, AI System 440 may be configured to determine which fields of the form to relate to. Such determination may be made using AI capabilities or through the use of static rules, such as statistically-based rules. Additionally, or alternatively, AI System 440 may employ AI techniques to determine initial values for fields of the form. In some cases, the initial values may be displayed in a mini-form or another GUI representation of the form that is shown outside Third-Party System 490 in which the form is actually implemented. In other cases, the initial values may be utilized as parameters to an automation process selected from Automation Dataset 470 that is configured to fill values in the relevant target form in the Third-Party System 490 (potentially, even without showing a mini-form or another GUI representation of the form).

In some exemplary embodiments, a Workstation Widget 450 may be utilized by AI System 440 to interact with the user. Workstation Widget 450 may be a native application, a web-based application executed in a browser, an application implemented in code injected to a current displayed webpage of a browser by a browser extension, or the like. Workstation Widget 450 may implement a chat widget (e.g., 220*a*, 220*b*, 220*c*, 340) for interacting with the end user, or any other alternative UI that is usable to interact with the user. Workstation Widget 450 may enable the user to converse with a bot. In some cases, the user provided natural language text may be provided to AI System 440 and output may be determined by AI System 440 and be provided via the Workstation Widget 450 to the user. In some cases, Workstation Widget 450 may implement a conversation (based on a pre-defined conversation script, or without the use of such pre-defined script, such as using an LLM) that is aimed at assisting the user in performing a digital task. The conversation may be utilized to infer user intent regarding the desired digital task to be performed, to identify a target form to be used to perform such digital task, and to determine values to fields of the target form. In some embodiments, AI System 440 may be configured to utilize NLP or LLM to understand user queries in natural language and provide responses that guide the user through the necessary steps to complete their tasks. As an example, Workstation Widget 450 may utilize a chatbot or a virtual assistant that interact with users in natural language, understanding their queries and providing relevant guidance.

AI System 440 may be configured to analyze the input provided by the user in Workstation Widget 450 to determine the intent, and contextually respond with appropriate suggestions or actions. AI System 440 may be further configured to analyze user behavior, preferences, and contextual cues to provide personalized recommendations, such as based on the role of the user, the type of forms or action the user usually performs, the platforms the user utilizes to perform such actions, or the like. By understanding user intent, users' interactions, and historical data. AI System 440 may offer tailored suggestions for forms, actions, content, or services. This may allow for a more engaging user experience and increased conversion rates compared to traditional interfaces.

In some exemplary embodiments, a machine learning component may be utilized to enable AI System 440 to learn from each interaction with users and continuously improve its performance. The learning process may be adapted to individual user needs and preferences, to optimize the guidance and automation it provides over time.

Additionally, or alternatively, AI System 440 may utilize NLP models to identify user intents and route them to the appropriate form from the appropriate platform, department or resources, to collect an accurate input for performing the desired action or task. This enables automated triaging and handling of user requests, saving time and improving efficiency. Additionally, or alternatively, AI System 440 may be configured to utilize NLP techniques to summarize large volumes of text, such as from different forms, different platforms, or the like, to identify fields or values required for performing the action or the task. By condensing the content into key points or extracting relevant information, the system can provide users with concise and contextually relevant fields to be filled, while neglecting irrelevant information and avoiding collecting unnecessary data. This helps automating navigation to the form and providing the information quickly and efficiently.

In some exemplary embodiments, AI System 440 may be configured to select a target form from Form Dataset 430 that is suitable for performing the digital task the user wishes to perform. The selection may be made based on a textual input provided by a user in natural language, via Workstation Widget 450. AI System 440 may be configured to select the target form using a computational model based on the textual input and based on user context data of the user. The computational model may be an organization-specific AI model that is trained based on data gathered by UI Intelligence Module 410, computed by Back Processing Model 420, data retained in Form Dataset 430, or the like. The computational model may be trained to select a relevant digital form in a relevant third-party digital system, utilized by members of the organization to perform tasks associated with the organization. In some exemplary embodiments, the training data may comprise historic form submissions that were submitted by members of the organization, such as indications of forms being submitted, values of the fields of the forms being submitted, properties of the third-party digital system in which the forms are submitted, user context data of users submitted the forms, or the like. It may be noted that being an organization-specific model, the computational model may be configured to select forms associated with different digital forms from different third-party digital systems. Additionally, or alternatively, Additionally, or alternatively, the computational model may be an organization-agnostic AI model that is configured to make its selection based on Form Dataset 430. In such an embodiment, Form Dataset 430 may retain the relevant information to be used by the computational model to make its selection, without having organization specific training. Instead of relying on organization specific training, the relevant dataset may include the relevant information. In some exemplary embodiments, such computational model may be trained to search in a generic Form Dataset 430 for the matching target form in view of data retained in the Form Dataset 430. It is noted that the selection may be made based on current user context and in view of historic information (which may be embedded in the computational model through training and/or may be retained in Form Dataset 430).

Additionally, or alternatively, AI System 440 may be configured to determine field values for fields of the target form. The field values may be determined based on the textual input and the target form description. In some cases AI System 440 may employ unsupervised ML techniques for determining the field values, such as general AI models Or organization-agnostic AI model, that may not require a special training. As an example, LLM models may be capable of performing the task of extracting information from a user's prompt and assign the values to relevant fields based on the fields' labels and in view of instructions given to them as input. In other cases, AI System 440 may utilize designated AI models trained for the specific task.

Additionally, or alternatively, AI System 440 may be configured to determine field values for at least a portion of fields of the target form, based on the textual input provided by the user and based on form metadata obtained from Form Dataset 430. For example, an organizational-agnostic LLM model may be utilized as the second model. The LLM model may be fed with a prompt that is a combination of the user input, description of the fields, and an instruction to determine values for the fields. As a concrete example, the prompt may be: "the form [name of form] includes fields: [first field]

of [type of first field], [second field] of [type of second field] . . . , the user wrote [user input], provide value for each field the user addressed, output should be in JSON format in the following format {"field_name": {"value": determined value, "confidence": confidence in the determined value}" for each field". The confidence of the determination may be utilized to determine, e.g., based on minimal confidence threshold, whether to utilize the determined value for the field. In some cases, the LLM model may be informed of which fields are mandatory, commonly-used, contextually-important, or the like, so that it may biased to filling in those fields.

In some cases, an action description may be returned to the user for confirmation via Workstation Widget 450. Workstation Widget 450 may display the action description and receive confirmation or rejection from the user. In some cases, the action description may be in the form of a mini-form. In some exemplary embodiments, the mini-form may be presented in Workstation Widget 450. The mini-form may include all fields for which a value was determined. In some exemplary embodiments, the mini-form may include additional fields such as mandatory fields, contextually-important fields, commonly-used fields, or the like. In some exemplary embodiments, the mini-form may exclude some of the fields of the target form and may not display corresponding fields. The user may interact with mini-form to update the values of the fields, insert new values to fields that were not filled or that their value is not determine automatically or artificially, or the like. The user may reject the selected form altogether, indicating the computational model was mistaken. In some cases, one or more alternative forms may be suggested to the user.

In some exemplary embodiments, upon user approval in Workstation Action Widget 450, which may approve the relevant form and the content of the fields, such as by clicking "Submit" button of the mini-form, Automation Player 480 may be invoked to execute an Automation 485. In some exemplary embodiments, Automation Player 480 may be part of a Digital Adoption Platform (not shown). In some exemplary embodiments, Automation Player 480 may be capable of automating tasks through either or both GUI and API interactions. Tasks may be performed on behalf of the user, either by interacting with the UI elements or by making API calls to the underlying system, thereby submitting the form in Third-Party Platform 490.

In some exemplary embodiments, Automation Player 480 may be configured to perform an automation that is configured to navigate target to the form and submit the target form in Third-Party Platform 490 with the determined field values, in response to receiving a user confirmation from the user. Automation Player 480 may be configured to mimic user interaction with a GUI of Third-Party Platform 490, such as by clicking on elements and inputting text into fields, or the like, such as by performing a Automation 485 that reaches a GUI display of the target form in Third-Party Platform 490 and fills the fields with the determined field values. In some exemplary embodiments, Automation Player 480 may be configured to perform an automation that was published in a Digital Adoption Platform used by the organization.

In some exemplary embodiments, Automation 485 may be retrieved from Automation Dataset 470. In some exemplary embodiments, Automation 485 may be a published automation to which the current user has access permissions. In some cases, Automation 485 may be a pre-baked automation process. In some exemplary embodiments, the target form information in Form Dataset 430 may point to Automation 485 or provide its identification for retrieval. In some cases, Automation 485 may be a template automation to which a URL of the form in Third-Party System 490 is provided as a parameter. Additionally, or alternatively, Automation 485 may be provided with a list of fields and corresponding values, indicating which fields are to be filled and by which value.

In some exemplary embodiments, Automation 485 may be configured to navigate to the form in Third-Party Platform 490, such as reaching the form through a URL URI, through mimicking user interactions with widgets and button to navigate to the form, or the like. In some exemplary embodiments, for example in case Third-Party System 490 is a Single-Page Applications (SPAs), the form may not be immediately reachable through a URL. Instead, Automation 485 may be configured to traverse several screens within Third-Party System 490 to reach the target form. Additionally, or alternatively, Automation 485 may be configured to fill the form, such as by mimicking user interaction with widgets, input fields, buttons, or the like, to access fields of the form, input information thereof, make selection thereby, submit the information, or the like. This automation can significantly increase efficiency and reduce the potential for user error. In some cases, Automation 485 may stop before submitting the form in Third-Party System 490, to ensure final user confirmation before form submission to avoid error, e.g., that may be caused due to hallucinations or due to error in the automatic filling of information. In some cases, Automation 485 may end in presenting a message to the user, directing the user's attention to the button in the Third-Party System 490 that needs to be pressed to submit the form.

It is noted that in some cases, there may be several different Third-Party Systems 490, each of which associated with a different set of forms. Based on the target form, the relevant system is determined. In some cases, the user's intent may be to perform a digital task that involves two or more forms in two or more different Third-Party Systems 490. In such a case, the mini-form may represent a combination of both forms and submission may be performed in each of the relevant of the two or more different Third-Party Systems 490.

Figure 5C:
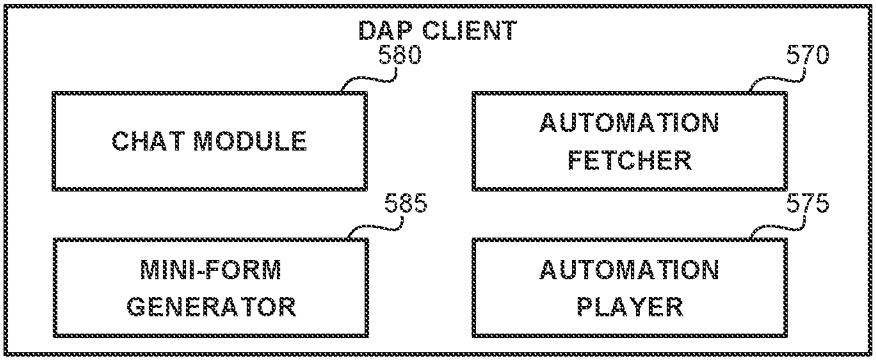

Referring now to FIGS. 5A-5C showing a schematic illustration of a system, in accordance with some exemplary embodiments of the disclosed subject matter.

FIG. 5A shows a schematic illustration of the system, in accordance with some exemplary embodiments of the disclosed subject matter. FIG. 5B shows a schematic illustration of DAP Server 510, in accordance with some exemplary embodiments of the disclosed subject matter. FIG. 5C shows a schematic illustration of a DAP Client 520, in accordance with some exemplary embodiments of the disclosed subject matter.

In some exemplary embodiments, a DAP Server 510 may be configured to serve as the backend infrastructure for data access and manipulation. DAP Server 510 may be configured to provide Admin 535 with no-code tools by which they can build automated processes, bots, analytics monitoring, or other content that augments third-party systems. DAP Server 510 may be utilized by multiple DAP Clients 520 to assist Users 525 thereof with software and feature adoption tools, as well as change management solutions for web, desktop, and mobile applications. DAP Clients 520 may be devices users by Users 525 that are members of the same organization that utilizes DAP server 510 to improve software adoption and user onboarding for their employees or customers. The organization may use DAP server 510 to enhance the user experience and productivity in different software applications through Third-Party Platforms 515, such as resource planning (ERP) software, customer relationship management (CRM) systems, productivity tools, Human Resources systems, or the like. DAP Clients 520 may use DAP Server 510 to help Users 525 to quickly learn and adapt to these applications, improving efficiency and reducing training time, as well as to improve Users' 525 efficiency through improved user interfaces. DAP Server 510 may have access to data and user interactions within applications of DAP Clients 520, handle data integration, data retrieval, and data processing tasks to support the functionality thereof. DAP Server 510 may be configured to provide engagement tools for notifying Users 525 of DAP Clients 520 of the steps they need to take or have missed, to provide business executives visibility across their applications and shows where processes need to be changed to improve user efficiency.

In some exemplary embodiments, an Admin Console 530 may be configured to define certain services and contents to be embedded by DAP Server 510 in Third-Party Platform 315 when used by DAP Clients 520. Admin Console 530 may be a web-based interface or dashboard that provides administrators with the tools and capabilities to manage and configure the DAP system. Admin Console 530 may be operated by one or more Admins 535, to adapt and integrate DAP server 510 data sources, automations, APIs, or other software systems in DAP Clients 520. Additionally, or alternatively, Admin Console 530 may be configured to define guided walkthroughs which contextually appear to User 525 as they navigate throughout Third-Party Platforms 515. As an example, Admin Console 530 may be configured to integrate DAP into the SaaS applications to offer in-app guidance and onboarding, reducing churn and increasing customer satisfaction. Admin 535 may customize and optimize the DAP's functionality to meet the specific needs of Clients 520. Admin Console 530 may enable Admin 535 to define, without using code, and using a point-and-click interface, automations, to publish or unpublish them so that they will or will not be available for different DAP Clients 520, set permissions thereto, or the like. Additionally, or alternatively, Admin Console 530 may enable Admin 535 to define form metadata relating to forms in Third-Party Platforms 515.

In some exemplary embodiments, User 525 may be a member of an organization utilized the disclosed system. It may be noted that the specific user may not be known to DAP Server 510 in advanced, e.g., may have never sustained the required action/task to the relevant Third-Party Platform 515 before, may have never utilized the DAP Server 510 for submission generating, or the like. DAP Server 510 may be configured to select the correct form required for the user's request, based on user context data of the user, user context data of the request, metadata of the user, statistic data, or the like. Such information may be extracted, predicted, or derived based on metadata of forms and tasks analyzed by UI Intelligence (UII) Module 540, based on the context of the request, by analyzing the user's activity, or the like.

In some exemplary embodiments, UI Intelligence Module 540 may be configured to monitor, track and analyze forms submitted by users of DAP Clients 520 via Third-Party Platforms 515, along with context patterns of the users. UI Intelligence Module 540 may be configured to track usage analytics of forms in Third-Party Platforms 515, such as tracking an absolute/relative number of form submissions in which a specific field is filled, identifying fields that cause relatively high rate of errors (e.g., above a threshold), identifying patterns of submitted field values, or the like. UI Intelligence Module 540 may be similar to UI Intelligence Module 410 in FIG. 4, and may be configured to perform actions performed by UI Intelligence Module 410 with respect to each of DAP Clients 520 and each of Third-Party Platforms 515, along with any additional required analysis performed by Back Processing Module 420, such as monitoring actions performed by Users 525 when submitting forms into Third-Party Platforms 515, analysis of interaction of Users 525 with the forms, or the like.

In some exemplary embodiments, Form Description Determinator 542 may be configured to determine form descriptions of forms from Third-Party Platforms 515 that are utilized by DAP Clients 520, such as an identifier of the form, names of fields of the form, fill requirement of the fields, or the like. The form descriptions may be retained in Form Dataset 550. Form Dataset 550 may be similar to Form Dataset 430 described in FIG. 4. Additionally, or alternatively, Form Dataset 550 may comprise multiple form datasets of multiple DAP Clients 520.

In some exemplary embodiments, interaction with Users 525 may be performed via Chat Module 580, such as providing input in natural language, providing output to the user, or the like. Chat Module 580 may be installed on DAP Server 510 and/or on Client 520 side (e.g., embedded in DAP Client 520 such Workstation Action Widget 450 in FIG. 4), or embedded on a third-party system that enables communication between DAP Server 510 and User 525 (e.g., conversation interfaces such as in FIG. 3A, 3B, 3D, 3G), or the like. Chat Module 580 may be utilized by DAP Server 510 to provide output to User 525 indicating the target form and the determined field values, and to enable User 525 to manually approve automatically determined form submission, prompting User 525 to provide additional input, or the like.

In some exemplary embodiments, First AI Model 544 may be configured to analyze input provide by User 525 of Client 520 to determine her intent a task. First AI Model 544 may be configured to select a target form from Form Dataset 550 that matches the intended task required to be performed by User 525. First AI Model 544 may specific for each DAP Client 520, and may be developed by UI Intelligence Module 540 based on analysis of user context data of Users 525 of the DAP Client when filing the relevant target forms.

Additionally, or alternatively, a Second AI Model 546 may be utilized to determine field values for at least a portion of fields of the target form selected by First AI Model 544, based on the textual input provided by User 525 and the target form description obtained from Form Dataset 550. It may be noted that Second AI Model 546 may be an organization-agnostic AI model, that may be utilized uniformly for different DAP Clients 520.

Pre-Baked Automation Creator **548*b* may automatically generate pre-baked automations that are configured to automatically fill-in values in the target form of the Third-Party Platforms 515. Pre-Baked Automation Creator 548*b* may configured to automatically generate the automations to be stored in Automation Dataset 560. Pre-Baked Automation Creator 548*b* may configured to utilize analysis obtained from UI Intelligence Module 540 to identify relevant fields of the form and to automatically set an automation that can traverse all fields of the form and set each of the fields' values. In some cases, Baked Automation Creator 548*b* may further use analysis obtained from UI Intelligence Module 540, such as analysis of form submission data, URLs utilized for submitting the form, user context data of users affecting the submission, or the like. Once the pre-baked automation of a form is generated, it may automatically be published and may be made available, in accordance with access privileges, to DAP Clients 520, to be used. In some cases, Admin 535 may manually update pre-baked automations, if necessary, similarly to updating any other automation. The automation may be unpublished, rendering it unavailable for usage by DAP Clients 520**.

Additionally, or alternatively, Automation Editor **548*a* may be utilized to manually create automations, or edit automatically generated automations to be stored in Automaton Dataset 560, and selected by Automation Fetcher 570 for submitting the relevant target form. Automation Editor 548*a* may be operated by Admin 535 of DAP Console 530, to enable Admin 535 to edit automations, define permissions, publishing/unpublishing the automation, or the like. Automation Editor 548*a* may be a no-code editor, having a point-and-click editor, in which Admin 535** can select a GUI element and indicate its meaning.

In some exemplary embodiments, Mini-Form Generator 585 may be configured to generated a mini-form to be displayed to User 525, such as Mini-Form 250 in FIG. 2, the mini-forms represented in FIGS. 3A, 3D, or the like. Mini-Form Generator 585 may be configured to generate mini-forms based on form descriptors obtained from Form Dataset 550 and based on the user input obtained from Chat Module 585. Additionally, or alternatively, Mini-Form Generator 585 may be configured to dynamically update the displayed mini-form based on user interactions and in accordance with data from Form Dataset 550. The mini-form may be displayed in the natural language interface, such as via Chat Module 580. Additionally, or alternatively, the mini-form may be generated on the fly, on the client side, based on input of User 525, or the like.

Automation Fetcher 570 may be configured to select the relevant automation from Automation Dataset 560, to be utilized for submitting the target form.

Automation Player 575 may be configured, in response to receiving a user confirmation from User 525, to perform the automation selected by Automation Fetcher 270, in accordance with the determined field values. Automation Player 575 may be configured to submit the target form in the Third-Party Platform 515 with the determined field values. In some exemplary embodiments, Automation Player 575 may be configured to mimic user interaction with a GUI of Third-Party Platform 515 for submitting the target form, such as by clicking on elements and inputting text into fields, reaching a GUI display of the target form in Third-Party Platform 515, and filling the portion of the fields with the determined field values, prompting User 525 to manually approve submission of the target form, or the like. In some cases, Automation Player 575 may be configured to request for additional conformation of User 525 when performing the GUI Automation on Third-Party Platform 515, such as after automatically filling fields of the target form and before actually submitting the target form. It may be noted that such GUI automation may be visible to User 525, without requiring any integration expect to a general review or a final confirmation of User 525.

Additionally, or alternatively, Automation Player 575 may be configured to perform an API automation, in cases that the GUI automations are not available or not feasible, such as for example when using mobile, or when GUI is not being utilized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a natural language input from a user that is using a user interface, wherein the natural language input indicates an intent to perform a task, the user is a member of an organization;

selecting, based on the natural language input, a target form from a pre-existing form dataset, the target form is a digital form in a third-party digital system, the form dataset comprises form descriptions of forms that are utilized by the organization, wherein a form description relating to a form comprises at least names of fields of the form, the target form is associated with a target form description;

determining initial field values for at least a portion of fields of the target form, wherein said determining the initial field values is performed based on the natural language input and the target form description; and providing, via the user interface, output to the user indicating the target form and the initial field values, wherein said providing comprises displaying a mini-form in the user interface, the mini-form is a Graphical User Interface (GUI) widget having input fields that match the at least portion of the fields of the target form, the input fields of the mini-form are labeled with a corresponding field name based on field names of the target form, wherein initial values of the at least portion of the fields are set based on the initial field values, wherein the target form comprises a field, wherein the mini-form does not provide a display representing the field, whereby the mini-form is a compact presentation of the target form with a reduced number of fields compared to a number of fields in the target form;

receiving user input from the user, the user input indicating at least one field value of a field in the target form, whereby obtaining determined field values that are based on at least a portion of the initial field values and on the user input; and in response to receiving user confirmation from the user, performing an automation that is configured to submit the target form in the third-party digital system with the determined field values.

2. The method of claim 1, wherein said receiving user input comprises: receiving a user update instruction to a field in the mini-form thereby changing an initial value to an updated value.

3. The method of claim 1, wherein said receiving user input comprises: receiving a user instruction to set a value to a field in the mini-form that does not have a previous set value.

4. The method of claim 1, wherein the mini-form comprises a confirmation button that is user-interactable, wherein the confirmation button is configured to indicate the user confirmation.

5. The method of claim 4 further comprises in response to performing the automation, causing the confirmation button to become disabled, whereby preventing additional user interaction with the confirmation button.

6. The method of claim 1, wherein the mini-form comprises a rejection button that is user-interactable, wherein interaction with the rejection button is indicative of a wrong form and causes a re-selection of another form instead of the target form.

7. The method of claim 1, further comprises:

selecting, based on the natural language input, a second target form from the pre-existing form dataset;

determining initial field values for at least a portion of fields of the second target form;

presenting in the mini-form one or more fields of the second target form with the determined initial field values thereof; and in response to a user rejecting the second target form, performing said providing, whereby replacing a form that is represented by the mini-form.

8. The method of claim 1, further comprises:

selecting, based on the natural language input, a second target form from the pre-existing form dataset;

determining for at least a portion of fields of the second target form;

wherein the mini-form is responsive to user instruction and is configured to selectively switch between a first display and a second display, the first display representing the target form and utilizing the initial field values for at least the portion of fields of the target form, the second display representing the second target form and utilizing the initial field values for at least the portion of fields of the second target form.

9. The method of claim 1, wherein the target form description comprises a fill requirement that indicates a mandatory field of the fields of the target, wherein the mini-form comprises a mandatory input field corresponding to the mandatory field, wherein the user confirmation in the mini-form is contingent on the mandatory input field being filled in the mini-form.

10. The method of claim 1, wherein members of the organization use a plurality of third-party digital systems, including the third-party digital system, wherein the pre-existing form dataset comprises information about forms from the plurality of third-party digital systems.

11. The method of claim 10, wherein the output that is provided to the user indicates that the target form is a form in the third-party digital system.

12. The method of claim 1, wherein the user interface is external to the third-party digital system.

13. The method of claim 1, wherein the form description comprises a fill requirement of the form, wherein said selecting is further based on the fill requirement.

14. The method of claim 13, wherein said selecting is biased to prefer selecting a first form over a second form, the first form having a lower number of fill requirements that are not fulfilled than the second form.

15. The method of claim 1, wherein said determining the initial field values comprises: generating a prompt based on the natural language input and based on the target form description; and feeding a Large Language Model (LLM) with the prompt.

16. The method of claim 1 further comprises:

in response to said determining initial field values and prior to said providing output, determining that a form submission of the target form using the initial field values is invalid in view of at least one fill requirement of the target form;

in response to a determination that the form submission of the target form using the determined field values is invalid, prompting the user to provide the user input, the user input is a second natural language input that is provided via the user interface; and determining, based on the second natural language input and based on the target form description, a portion of the determined field values, thereby preventing the automation from submitting the target form with the values that do not comply with the at least one fill requirement.

17. The method of claim 1, wherein said performing the automation comprises mimicking user interaction with a Graphical User Interface (GUI) of the third-party digital system by clicking on elements and inputting text into fields, whereby reaching a GUI display of the target form in the third-party digital system and filling the portion of the fields with the determined field values.

18. The method of claim 17 further comprises prompting the user to manually approve submission of the target form, whereby a second user confirmation is provided.

19. The method of claim 1, wherein the automation is performed using an Application Programming Interface (API) call of the third-party digital system, wherein the API call is configured to provide a functionality of submitting the target form.

20. The method of claim 1, wherein the automation is a pre-baked automation process that is configured to automatically fill-in values in the target form of the third-party digital system, the pre-baked automation process is automatically generated and published in a digital adoption platform used by the organization.

21. The method of claim 1, wherein said selecting is performed based on user context data, the user context data comprises at least one of:

a role of the user in the organization, a department of the user within the organization, permissions of the user that define which of the forms that are utilized by the organization the user is allowed to use, a client device used by the user for providing the natural language input, a user location of the user when providing the natural language input, user form selection history, user form usage history, and a time in which the user provides the natural language input.

22. The method of claim 1, wherein said selecting is performed by a learning model, the learning model is trained based on a training dataset, the training data comprises historic form submissions that were submitted by members of the organization, a historic form submission of the historic form submissions comprises:

an indication of a form being submitted; and values of at least a portion of fields of the form being submitted.

23. The method of claim 1, wherein the natural language input is at least one of: a voice-based input and a free-text input.

24. A computerized apparatus having a processor and a memory coupled thereto, the processor being adapted to perform the steps of:

obtaining a natural language input from a user that is using a user interface, wherein the natural language input indicates an intent to perform a task, the user is a member of an organization;

selecting, based on the natural language input, a target form from a pre-existing form dataset, the target form is a digital form in a third-party digital system, the form dataset comprises form descriptions of forms that are utilized by the organization, wherein a form description relating to a form comprises at least names of fields of the form, the target form is associated with a target form description;

determining initial field values for at least a portion of fields of the target form, wherein said determining the initial field values is performed based on the natural language input and the target form description; and providing, via the user interface, output to the user indicating the target form and the initial field values, wherein said providing comprises displaying a mini-form in the user interface, the mini-form is a Graphical User Interface (GUI) widget having input fields that match the at least portion of the fields of the target form, the input fields of the mini-form are labeled with a corresponding field name based on field names of the target form, wherein initial values of the at least portion of the fields are set based on the initial field values, wherein the target form comprises a field, wherein the mini-form does not provide a display representing the field, whereby the mini-form is a compact presentation of the target form with a reduced number of fields compared to a number of fields in the target form;

receiving user input from the user, the user input indicating at least one field value of a field in the target form, whereby obtaining determined field values that are based on at least a portion of the initial field values and on the user input; and in response to receiving user confirmation from the user, performing an automation that is configured to submit the target form in the third-party digital system with the determined field values.

25. The computerized apparatus of claim 24, wherein said receiving user input comprises at least one of: receiving a user update instruction to a field in the mini-form thereby changing an initial value to an updated value; and receiving a user instruction to set a value to a field in the mini-form that does not have a previous set value.

26. The computerized apparatus of claim 24, wherein the mini-form comprises at least one of:

a confirmation button that is user-interactable, the confirmation button is configured to indicate the user confirmation; and a rejection button that is user-interactable, the rejection button is configured to indicate a wrong form and to cause a re-selection of another form instead of the target form.

27. The computerized apparatus of claim 24, the processor is further configured to perform:

selecting, based on the natural language input, a second target form from the pre-existing form dataset;

determining initial field values for at least a portion of fields of the second target form;

presenting in the mini-form one or more fields of the second target form with the determined initial field values thereof; and in response to a user rejecting the second target form, performing said providing, whereby replacing a form that is represented by the mini-form.

28. The computerized apparatus of claim 24, the processor is further configured to perform:

selecting, based on the natural language input, a second target form from the pre-existing form dataset;

determining for at least a portion of fields of the second target form;

wherein the mini-form is responsive to user instruction and is configured to selectively switch between a first display and a second display, the first display representing the target form and utilizing the initial field values for at least the portion of fields of the target form, the second display representing the second target form and utilizing the initial field values for at least the portion of fields of the second target form.

29. The computerized apparatus of claim 24, wherein the target form description comprises a fill requirement that indicates a mandatory field of the fields of the target, wherein the mini-form comprises a mandatory input field corresponding to the mandatory field, wherein the user confirmation in the mini-form is contingent on the mandatory input field being filled in the mini-form.

30. The computerized apparatus of claim 24, wherein the form description comprises a fill requirement of the form, wherein said selecting is further based on the fill requirement and is biased to prefer selecting a first form over a second form, the first form having a lower number of fill requirements that are not fulfilled than the second form.

31. The computerized apparatus of claim 24, wherein said determining the initial field values comprises: generating a prompt based on the natural language input and based on the target form description; and feeding a Large Language Model (LLM) with the prompt.

32. The computerized apparatus of claim 24, wherein the processor is further configured to perform:

in response to said determining initial field values and prior to said providing output, determining that a form submission of the target form using the initial field values is invalid in view of at least one fill requirement of the target form;

in response to a determination that the form submission of the target form using the determined field values is invalid, prompting the user to provide the user input, the user input is a second natural language input that is provided via the user interface; and determining, based on the second natural language input and based on the target form description, a portion of the determined field values, thereby preventing the automation from submitting the target form with the values that do not comply with the at least one fill requirement.

33. The computerized apparatus of claim 24, wherein said selecting is performed by a learning model, the learning model is trained based on a training dataset, the training data comprises historic form submissions that were submitted by members of the organization, a historic form submission of the historic form submissions comprises:

an indication of a form being submitted; and values of at least a portion of fields of the form being submitted.

34. A computer program product comprising a non-transitory computer readable storage medium retaining program instructions, which program instructions when read by a processor, cause the processor to perform a method comprising:

obtaining a natural language input from a user that is using a user interface, wherein the natural language input indicates an intent to perform a task, the user is a member of an organization;

selecting, based on the natural language input, a target form from a pre-existing form dataset, the target form is a digital form in a third-party digital system, the form dataset comprises form descriptions of forms that are utilized by the organization, wherein a form description relating to a form comprises at least names of fields of the form, the target form is associated with a target form description;

determining initial field values for at least a portion of fields of the target form, wherein said determining the initial field values is performed based on the natural language input and the target form description; and providing, via the user interface, output to the user indicating the target form and the initial field values, wherein said providing comprises displaying a mini-form in the user interface, the mini-form is a Graphical User Interface (GUI) widget having input fields that match the at least portion of the fields of the target form, the input fields of the mini-form are labeled with a corresponding field name based on field names of the target form, wherein initial values of the at least portion of the fields are set based on the initial field values, wherein the target form comprises a field, wherein the mini-form does not provide a display representing the field, whereby the mini-form is a compact presentation of the target form with a reduced number of fields compared to a number of fields in the target form;

receiving user input from the user, the user input indicating at least one field value of a field in the target form, whereby obtaining determined field values that are based on at least a portion of the initial field values and on the user input; and in response to receiving user confirmation from the user, performing an automation that is configured to submit the target form in the third-party digital system with the determined field values.

* * * * *